US011917335B2

(12) United States Patent
Satoh et al.

(10) Patent No.: US 11,917,335 B2
(45) Date of Patent: Feb. 27, 2024

(54) IMAGE PROCESSING DEVICE, MOVABLE DEVICE, METHOD, AND PROGRAM

(71) Applicant: Sony Corporation, Tokyo (JP)

(72) Inventors: Ryuta Satoh, Tokyo (JP); Suguru Aoki, Tokyo (JP); Keitaro Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 496 days.

(21) Appl. No.: 17/253,621

(22) PCT Filed: May 10, 2019

(86) PCT No.: PCT/JP2019/018771
§ 371 (c)(1),
(2) Date: Dec. 18, 2020

(87) PCT Pub. No.: WO2020/003764
PCT Pub. Date: Jan. 2, 2020

(65) Prior Publication Data
US 2021/0264638 A1 Aug. 26, 2021

(30) Foreign Application Priority Data
Jun. 25, 2018 (JP) ................. 2018-120202

(51) Int. Cl.
G06T 7/90 (2017.01)
G06V 20/00 (2022.01)
H04N 7/18 (2006.01)
(52) U.S. Cl.
CPC ............... H04N 7/183 (2013.01); G06T 7/90 (2017.01); G06V 20/00 (2022.01); G06T 2207/10024 (2013.01); G06T 2207/30252 (2013.01)

(58) Field of Classification Search
CPC . H04N 7/183; G06T 7/90; G06T 2207/10024; G06T 2207/30252; G06V 20/00
See application file for complete search history.

(56) References Cited

U.S. PATENT DOCUMENTS 9,600,853 B2* 3/2017 Jang .......................... G06T 1/20
2002/0092029 A1 7/2002 Smith
2003/0063213 A1* 4/2003 Poplin .................... H04N 23/70
348/E5.042

(Continued)

FOREIGN PATENT DOCUMENTS

CN 1533535 A 9/2004
CN 101031050 A 9/2007

(Continued)

OTHER PUBLICATIONS

Reuss et al. ("Camera Raw for High Dynamic Range Workflows," SMPTE Motion Imaging Journal, vol. 125, Issue 5, Jul. 2016) (Year: 2016).*

(Continued)

Primary Examiner — Yubin Hung
(74) Attorney, Agent, or Firm — XSENSUS LLP

(57) ABSTRACT

Where a highly accurate image analysis is required, for example, only RAW images selected according to specified conditions are selected and transmitted to a server. There are provided an imaging unit that is mounted on a movable device, an image signal processor that generates a color image by signal processing of the RAW image which is an output of an imaging element of the imaging unit, an image analysis unit that executes analysis processing of the color image, a transmission necessity determination unit that determines transmission necessity of the RAW image to the server, and a transmission unit that transmits the RAW image to the external server according to a determination result. The transmission necessity determination unit decides the transmission necessity of the RAW image on the basis of a transmission timing control at constant intervals, (Continued)

imaging and signal processing parameters, an image analysis result, device information, or the like.

16 Claims, 17 Drawing Sheets

(56) References Cited

U.S. PATENT DOCUMENTS

| | | | | |
|---|---|---|---|---|
| 2006/0279636 | A1* | 12/2006 | Sasaki | H04N 1/00278 |
| | | | | 348/207.2 |
| 2012/0050769 | A1* | 3/2012 | Houjou | G06K 15/1878 |
| | | | | 358/1.9 |
| 2012/0076205 | A1 | 3/2012 | Segall | |
| 2019/0025801 | A1* | 1/2019 | Suzuki | G05B 19/4183 |

FOREIGN PATENT DOCUMENTS

| | | |
|---|---|---|
| CN | 106385568 A | 2/2017 |
| CN | 107592549 A | 1/2018 |
| JP | 2009-239772 A | 10/2009 |
| JP | 2016-63251 A | 4/2016 |
| JP | 2016-127564 A | 7/2016 |
| JP | 2016127564 A * | 7/2016 |
| JP | 2017112421 | 6/2017 |
| WO | WO-2016026447 A1 * | 2/2016 ............. G08B 25/00 |
| WO | 2017/038100 A1 | 3/2017 |
| WO | 2017/212639 A1 | 12/2017 |
| WO | 2018/225596 A1 | 12/2018 |

OTHER PUBLICATIONS

Liu Haosen, Research on H.264-based Remote Video Monitoring System, Electronics World, May 31, 2017, p. 98.
International Search Report and Written Opinion dated Jul. 2, 2019, received for PCT Application No. PCT/JP2019/018771, Filed on May 10, 2019, 11 pages including English Translation.

* cited by examiner

FIG. 5

| | PARAMETER TYPE | | PARAMETER |
|---|---|---|---|
| (1) | IMAGING PARAMETER | (1a) | SHUTTER SPEED |
| | | (1b) | ANALOG GAIN |
| (2) | SIGNAL PROCESSING PARAMETER | (2a) | DIGITAL GAIN |
| | | (2b) | WHITE BALANCE (AWB) CONTROL VALUE |
| | | (2c) | HIGH DYNAMIC RANGE (HDR) CONTROL VALUE |

FIG. 12

| | DEVICE INFORMATION | TRANSMISSION NECESSITY DETERMINATION PROCESSING EXAMPLE |
|---|---|---|
| (1) | INFORMATION FLOWING IN BUS | TRANSMIT RAW IMAGE IN CASE WHERE FAILURE INFORMATION IS DETECTED |
| (2) | NUMBER OF DEFECTIVE PIXELS IN IMAGING ELEMENT | TRANSMIT RAW IMAGE IN CASE WHERE NUMBER OF DEFECTIVE PIXELS IS EQUAL TO OR GREATER THAN THRESHOLD VALUE |
| (3) | ABNORMALITY DETECTION INFORMATION OF SIGNAL PROCESSOR AND THE LIKE | TRANSMIT RAW IMAGE IN CASE WHERE ABNORMALITY OF PROCESSING CIRCUIT OF IMAGE SIGNAL PROCESSOR OR THE LIKE IS DETECTED IN CHECK RESULT OF BUILT IN TEST (Built in Test) OR THE LIKE |

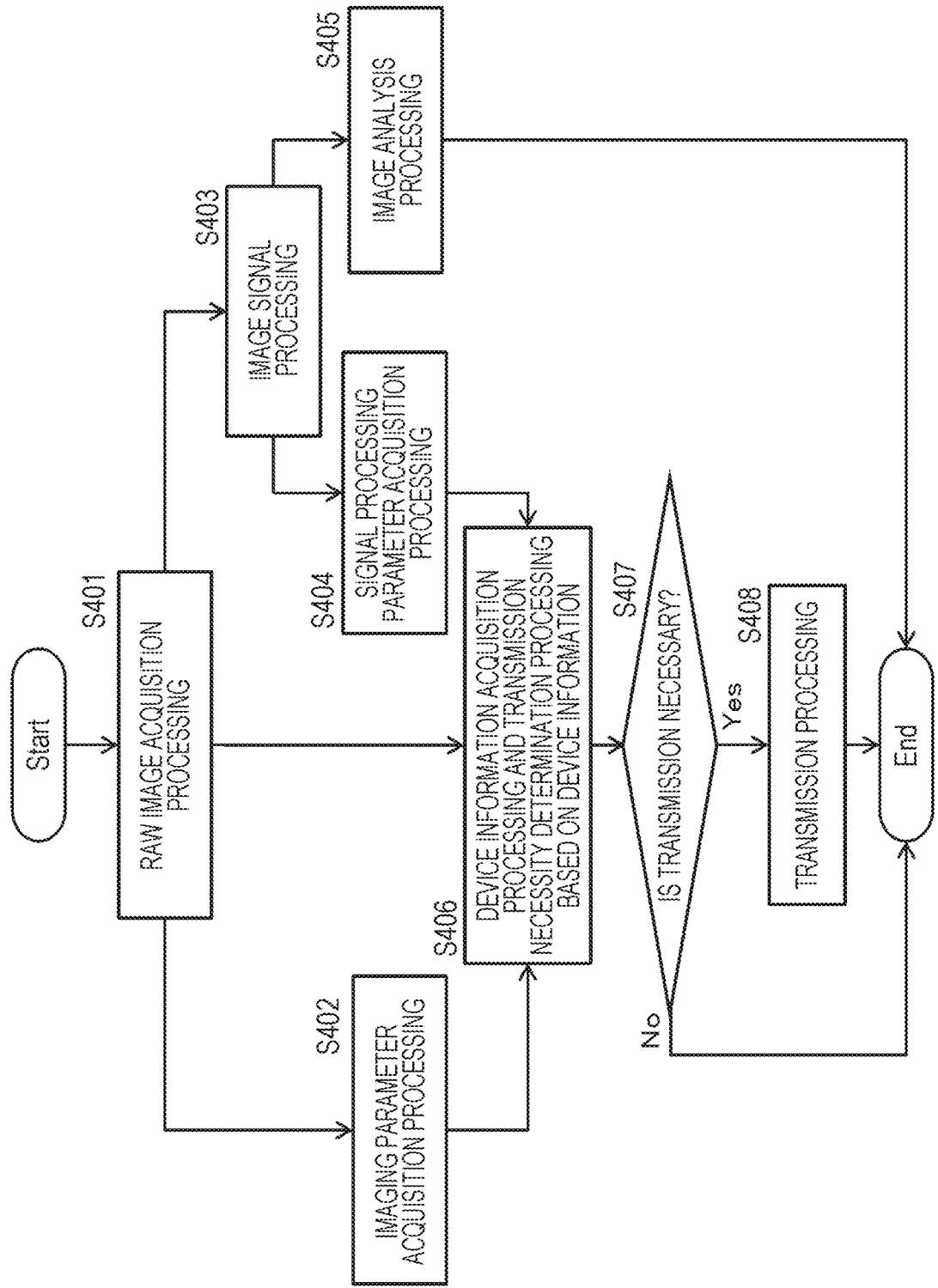

IMAGE PROCESSING DEVICE, MOVABLE DEVICE, METHOD, AND PROGRAM

CROSS-REFERENCE TO RELATED APPLICATIONS

The present application is based on PCT filing PCT/JP2019/018771, filed May 10, 2019, which claims priority to JP 2018-120202, filed Jun. 25, 2018, the entire contents of each are incorporated herein by reference.

TECHNICAL FIELD

The present disclosure relates to an image processing device, a movable device, a method, and a program. More specifically, the present disclosure relates to an image processing device, a movable device, a method, and a program which perform an analysis of an image captured by a camera provided in a movable device such as an automobile to detect an obstacle such as a person.

BACKGROUND ART

During the traveling of an automobile, many systems are used to check whether or not there is an obstacle such as a person in a traveling direction by an analysis of an image captured by a camera.

In a case where an image analysis is performed, the analysis is generally performed using a color image such as an image after image signal processing for a RAW image which is an output of an imaging element (image sensor) of the camera, for example, an RGB image after demosaicing processing or white balance adjustment processing. However, in a case where the RAW image and the RGB image are compared, the RAW image has a larger amount of information, and thus a more detailed image analysis result can be obtained by performing an analysis using the RAW image.

Note that, there are Patent Document 1 (Japanese Patent Application Laid-Open No. 2009-239772) and the like as the technology in the related art in which the image analysis using the RAW image is disclosed.

However, since the RAW image has a larger amount of information than the RGB image, there is a problem that it takes time for data transfer and data processing, for example.

CITATION LIST

Patent Document

Patent Document 1: Japanese Patent Application Laid-Open No. 2009-239772

SUMMARY OF THE INVENTION

Problems to be Solved by the Invention

The present disclosure has been made in view of the problems described above, for example, and in a configuration in which a person, an obstacle, or the like is detected by using images captured by a camera mounted on a movable device such as an automobile, the RAW image which is an output from an imaging element (image sensor) of the camera is selectively transmitted to a server, and an analysis of the RAW image is performed on the server side. There are provided an image processing device, a movable device, a method, and a program which can acquire a highly accurate analysis result without increasing a processing load in the movable device, by selectively performing transmission processing of the RAW image to the server.

Solutions to Problems

A first aspect of the present disclosure is an image processing device including an image signal processor that executes signal processing on a RAW image which is an output of an imaging element of an imaging unit, and generates a color image;

an image analysis unit that executes analysis processing of the color image generated by the image signal processor;

a transmission necessity determination unit that decides whether or not the RAW image is to be transmitted to an external server; and a transmission unit that transmits the RAW image to the external server according to a determination result of the transmission necessity determination unit.

Moreover, a second aspect of the present disclosure is a movable device including an imaging unit that is mounted on the movable device;

an image signal processor that executes signal processing on a RAW image which is an output of an imaging element of the imaging unit, and generates a color image;

an image analysis unit that executes analysis processing of the color image generated by the image signal processor;

a transmission necessity determination unit that decides whether or not the RAW image is to be transmitted to an external server; and a transmission unit that transmits the RAW image to the external server according to a determination result of the transmission necessity determination unit.

Moreover, a third aspect of the present disclosure is an image processing system including an image processing device; and a server, in which the image processing device includes an image signal processor that executes signal processing on a RAW image which is an output of an imaging element of an imaging unit, and generates a color image, an image analysis unit that executes analysis processing of the color image generated by the image signal processor, a transmission necessity determination unit that decides whether or not the RAW image is to be transmitted to an external server, and a transmission unit that transmits the RAW image to the external server according to a determination result of the transmission necessity determination unit, and the server receives the RAW image from the image processing device and executes analysis processing of the RAW image.

Moreover, a fourth aspect of the present disclosure is an image processing method executed in an image processing device, the image processing method including an image signal processing step of causing an image signal processor to execute signal processing on a RAW image which is an output of an imaging element of an imaging unit, and to generate a color image;

an image analysis step of causing an image analysis unit to execute analysis processing of the color image generated in the image signal processing step;

a transmission necessity determination step of causing a transmission necessity determination unit to decide whether or not the RAW image is to be transmitted to an external server; and a transmission step of causing a transmission unit to transmit the RAW image to the external server according to a determination result of the transmission necessity determination step.

Moreover, a fifth aspect of the present disclosure is a program causing an image processing device to execute image processing, the program causing:

an image signal processor to execute an image signal processing step of executing signal processing on a RAW image which is an output of an imaging element of an imaging unit, and generating a color image;

an image analysis unit to execute an image analysis step of executing analysis processing of the color image generated in the image signal processing step;

a transmission necessity determination unit to execute a transmission necessity determination step of deciding whether or not the RAW image is to be transmitted to an external server; and a transmission unit to execute a transmission step of transmitting the RAW image to the external server according to a determination result of the transmission necessity determination step.

Note that, the program of the present disclosure is, for example, a program that can be provided by a storage medium or a communication medium provided in a computer-readable format to an information processing device or a computer system that can execute various program codes. By providing such a program in a computer-readable format, processing according to the program is realized on the information processing device or the computer system.

Other objects, features, and advantages of the present disclosure will be apparent from a more detailed description based on the embodiments of the present disclosure described below and the accompanying drawings. Note that, in the present specification, the system is a logical set configuration of a plurality of devices, and is not limited to a system in which the devices of the respective configurations are in the same housing.

Effects of the Invention

According to the configuration of one embodiment of the present disclosure, a configuration is realized in which only RAW images selected according to specified conditions are selected and transmitted to a server in a case where a highly accurate image analysis is required, for example.

Specifically, for example, there are provided an imaging unit that is mounted on a movable device, an image signal processor that generates a color image by signal processing of the RAW image which is an output of an imaging element of the imaging unit, an image analysis unit that executes analysis processing of the color image, a transmission necessity determination unit that determines transmission necessity of the RAW image to the server, and a transmission unit that transmits the RAW image to the external server according to a determination result. The transmission necessity determination unit decides the transmission necessity of the RAW image on the basis of a transmission timing control at constant intervals, imaging and signal processing parameters, an image analysis result, device information, or the like.

With the configuration, a configuration is realized in which only RAW images selected according to specified conditions are selected and transmitted to a server in a case where a highly accurate image analysis is required, for example.

Note that, the effects described in the specification are merely examples and are not limited, and may have additional effects.

BRIEF DESCRIPTION OF DRAWINGS

FIG. 5 is a diagram for describing an imaging parameter and a signal processing parameter.

FIG. 12 is a diagram for describing an example of device information.

FIG. 13 is a diagram illustrating a flowchart for describing a processing sequence executed by the image processing device of the present disclosure.

MODE FOR CARRYING OUT THE INVENTION

Hereinafter, the details of an image processing device, a movable device, a method, and a program of the present disclosure will be described with reference to the drawings. Note that, the description will be given according to the following items.

1. Overview of configuration and processing of present disclosure
2. Regarding specific example of configuration and processing of image processing device
2-1. (Embodiment 1) Embodiment of intermittently transmitting RAW images at constant intervals 2-2. (Embodiment 2) Embodiment of executing transmission necessity determination of RAW image based on parameter 2-3. (Embodiment 3) Embodiment of executing transmission necessity determination of RAW image based on image analysis result 2-4. (Embodiment 4) Embodiment of executing transmission necessity determination of RAW image based on device information 2-5. (Embodiment 5) Embodiment of executing transmission necessity determination of RAW image based on color image analysis result on server 3. Regarding hardware configuration example of image processing device 4. Summary of configuration of present disclosure

1. Overview of Configuration and Processing of Present Disclosure

First, an outline of the configuration and processing of the present disclosure will be described with reference to FIG. 1 and subsequent drawings.

Figure 1:
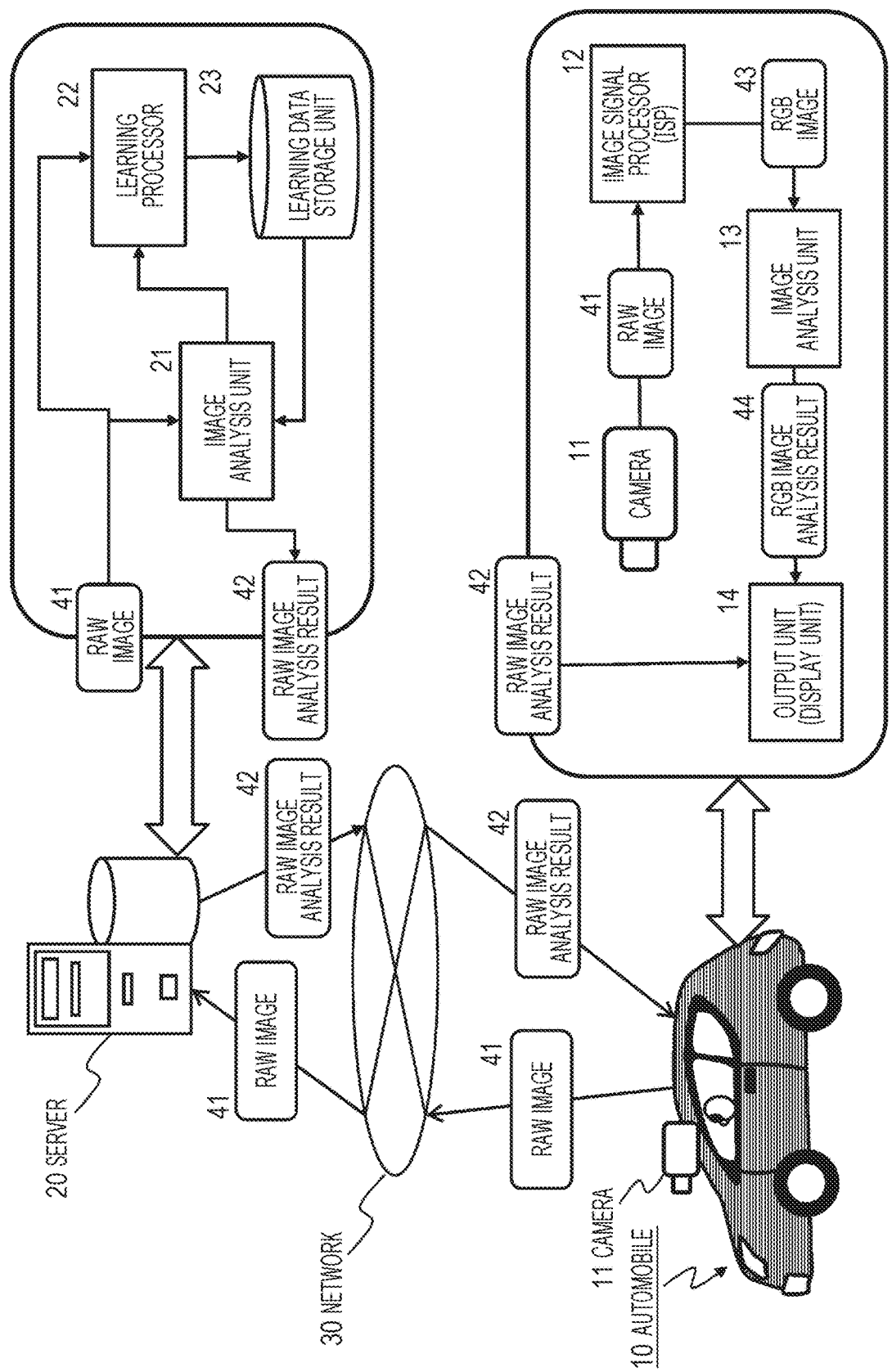
FIG. 1 is a diagram for describing an outline of a configuration and processing of the present disclosure.

FIG. 1 is a diagram for describing an outline of the configuration and processing of the present disclosure.

Note that, in the following embodiments, an example of an automobile (vehicle) 10 will be described as an example of a movable device, but the processing of the present disclosure can be used in various movable devices other than automobiles.

For example, the processing of the present disclosure can be applied to drones, robot-type mobile objects such as logistics robots, and the like.

As illustrated in FIG. 1, the automobile 10 is equipped with a camera 11.

Note that, in the following embodiments, embodiments using images captured by the camera 11 that images the front of the automobile 10 will be described, but the configuration and processing of the present disclosure are not limited to the camera that images the front, and can be applied to images captured by the camera that images various other directions such as the rear. Further, as the camera 11, a camera that captures a normal image, or a camera provided with a wide-angle lens such as a fisheye lens can also be used.

The automobile 10 has a configuration capable of communicating with a server 20 via a network 30.

A RAW image 41, which is an output of the imaging element (image sensor) of the camera 11 of the automobile 10, is transmitted to the server 20 via a network as illustrated in the drawing.

The server 20 executes an image analysis based on this RAW image.

The right side of FIG. 1 illustrates the configuration of an image processor mounted on the automobile 10 and the configuration of an image processor in the server 20. The configuration of the image processor mounted on the automobile 10 illustrated in the lower right of FIG. 1 will be described.

The RAW image 41, which is an output of the imaging element (image sensor) of the camera 11, is subjected to image processing by an image signal processor (ISP) 12. For example, processing for generating a color image (for example, an RGB image), such as demosaicing processing for setting an RGB pixel value for each pixel and white balance adjustment processing is executed.

An RGB image 43 generated by the image signal processor (ISP) 12 is input to an image analysis unit 13. The image analysis unit 13 executes an image analysis using the RGB image 43, and performs processing of detecting, for example, a person, an obstacle, or the like. An RGB image analysis result 44 generated by the image analysis unit 13 is output to an output unit (display unit) 14.

For example, in a case where a person is detected, a warning display such as displaying a detection frame in a person area is performed.

On the other hand, the server 20 inputs the RAW image 41 received from the automobile 10 to an image analysis unit 21 and a learning processor 22. The image analysis unit 21 executes an image analysis using the RAW image 41, and performs processing of detecting, for example, a person, an obstacle, or the like. A RAW image analysis result 42 generated by the image analysis unit 21 is transmitted to the automobile 10 via the network 30, and is output to the output unit (display unit) 14 of the automobile 10.

Note that, the analysis result of the image analysis unit 21 of the server 20 is input to the learning processor 22. The learning processor 22 inputs the RAW image 41 and the analysis results of the image analysis unit 21, executes learning processing related to the detection of people and other objects, and generates and stores learning data for improving the accuracy of an object manifestation by the image analysis in a learning data storage unit 23. In a case where the image analysis unit 21 performs an image analysis, analysis processing referring to the learning data stored in the learning data storage unit 23 is executed. An analysis using such learning data enables more accurate object detection and specific processing.

In the configuration of the present disclosure, as illustrated in FIG. 1, the RAW image 41, which is an output of the imaging element (image sensor) of the camera 11 mounted on the automobile 10, is transmitted to the server 20, and the server 20 executes an analysis of the RAW image. Since the RAW image has a larger amount of information than the RGB image, a highly accurate analysis result can be obtained.

However, since the RAW image has a large amount of data, if processing of continuously transmitting all the RAW images output from the camera 11 to the server 20 is performed, the processing load on the automobile 10 side and the network bandwidth load will become excessive. As a result, there is a possibility that a data transmission delay, a processing delay of the image processor on the automobile 10 side, and the like may occur.

In order to solve such a problem, the image processing device of the automobile 10 selectively transmits only a part of the RAW images output from the camera 11 to the server 20. Hereinafter, a specific example of the configuration of the image processing device that executes this processing and the processing will be described.

2. Regarding Specific Example of Configuration and Processing of Image Processing Device A specific example of the configuration and processing of the image processing device configured in the automobile will be described with reference to FIG. 2 and subsequent drawings.

The following plurality of embodiments will be described in sequence.

(Embodiment 1) Embodiment of intermittently transmitting RAW images at constant intervals (Embodiment 2) Embodiment of executing transmission necessity determination of RAW image based on parameter (Embodiment 3) Embodiment of executing transmission necessity determination of RAW image based on image analysis result (Embodiment 4) Embodiment of executing transmission necessity determination of RAW image based on device information (Embodiment 5) Embodiment of executing transmission necessity determination of RAW image based on color image analysis result on server (2-1. (Embodiment 1) Embodiment of Intermittently Transmitting RAW Images at Constant Intervals)

First, as Embodiment 1 of the image processing device of the present disclosure, an embodiment of intermittently transmitting the RAW images at constant intervals will be described with reference to FIG. 2 and subsequent drawings.

A configuration example of an image processing device 100 of Embodiment 1 will be described with reference to FIG. 2.

Figure 2:
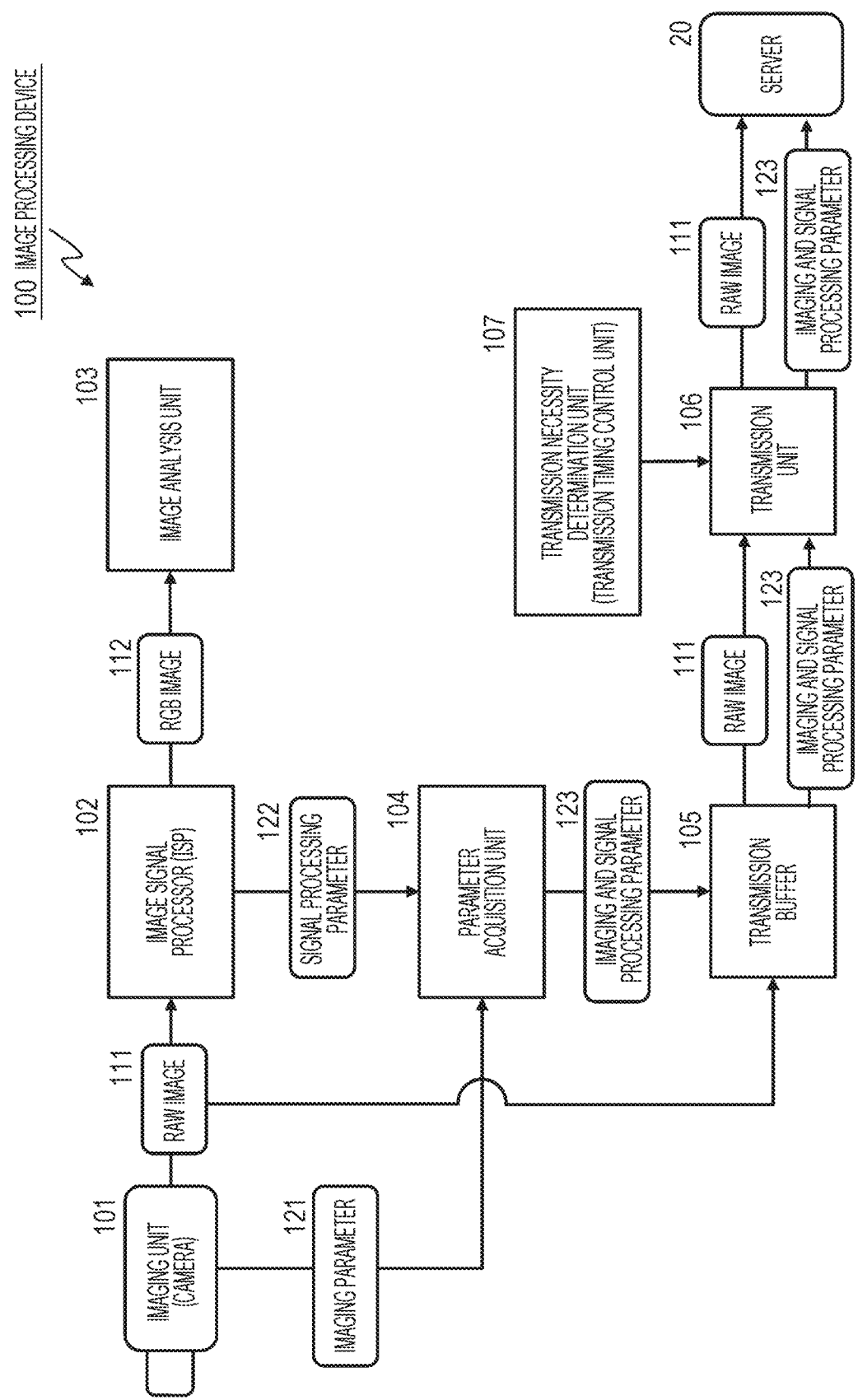
FIG. 2 is a diagram for describing a configuration example of an image processing device of the present disclosure.

The image processing device 100 illustrated in FIG. 2 is an image processing device configured in the automobile 10. The image processing device 100 has an imaging unit (camera) 101, an image signal processor (ISP) 102, an image analysis unit 103, a parameter acquisition unit 104, a transmission buffer 105, a transmission unit 106, and a transmission timing control unit 107.

A RAW image 111, which is an output from the imaging element (image sensor) of the imaging unit (camera) 101, is input to the image signal processor (ISP) 102. The image signal processor (ISP) 102 executes image signal processing on the RAW image 111. For example, processing for generating a color image (for example, an RGB image), such as demosaicing processing for setting an RGB pixel value for each pixel and white balance adjustment processing is executed.

An RGB image 112 generated by the image signal processor (ISP) 102 is input to the image analysis unit 103. The image analysis unit 103 executes an image analysis using the RGB image 112, and performs processing of detecting, for example, a person, an obstacle, or the like. An RGB image analysis result generated by the image analysis unit 103 is output to an output unit (display unit) and the like (not illustrated). For example, in a case where a person is detected, a warning display such as displaying a detection frame in a person area is performed.

The parameter acquisition unit 104 acquires an imaging parameter 121 at the time of capturing the image in the imaging unit 101, and a signal processing parameter 122 in the image signal processor (ISP) 102.

For example, the imaging parameter includes shutter speed, analog gain, and the like. Further, the signal processing parameter includes digital gain, a white balance (AWB) control value, a high dynamic range (HDR) control value, and the like.

An imaging and signal processing parameter 123 acquired by the parameter acquisition unit 104 is stored in the transmission buffer 105 together with the RAW image 111 which is an output from the imaging element (image sensor) of the imaging unit (camera) 101.

The transmission unit 106 transmits the RAW image 111 and the imaging and signal processing parameter 123 stored in the transmission buffer 105 to the server 20.

However, as described above, since the RAW image has a large amount of data, if processing of continuously transmitting all the RAW images output from the imaging element (image sensor) of the imaging unit (camera) 101 to the server 20 is performed, the processing load on the automobile 10 side and the network bandwidth load may become excessive, and thus there is a possibility that a processing delay, a data transfer delay, or the like of the image processor 100 of the automobile 10 may occur.

In this embodiment, in order to prevent such a problem, the transmission timing control unit 107 that functions as a transmission necessity determination unit intermittently executes the transmission of the RAW images at constant intervals. For example, only the RAW images selected at constant intervals such as every N frames or every Msec are transmitted to the server 20.

The data to be transmitted to the server 20 is, for example, the RAW image 111 and the imaging and signal processing parameter 123. The imaging and signal processing parameter 123 is a parameter set including the imaging parameter at the time of capturing the RAW image 111 and the image signal processing parameter applied to the image signal processing for the RAW image 111.

Note that, in the embodiments described below including this embodiment, an example in which the RAW image 111 and the imaging and signal processing parameter 123 are transmitted from the image processing device 100 on the automobile side to the server 20 is described, but in any of the embodiments, various settings such as a configuration of transmitting only the RAW image, a configuration of transmitting the RAW image and the imaging parameter, or the RAW image and the signal processing parameter can be made.

In Embodiment 1, since the transmission timing control unit 107, which functions as the transmission necessity determination unit, is configured to intermittently execute the transmission of the RAW images at constant intervals, it is possible to perform smooth processing without causing a data transfer delay and a processing delay without causing excessive use of the transfer bandwidth or the processing load on the automobile side.

Next, the processing sequence of Embodiment 1 will be described with reference to the flowchart illustrated in FIG. 3.

Figure 3:
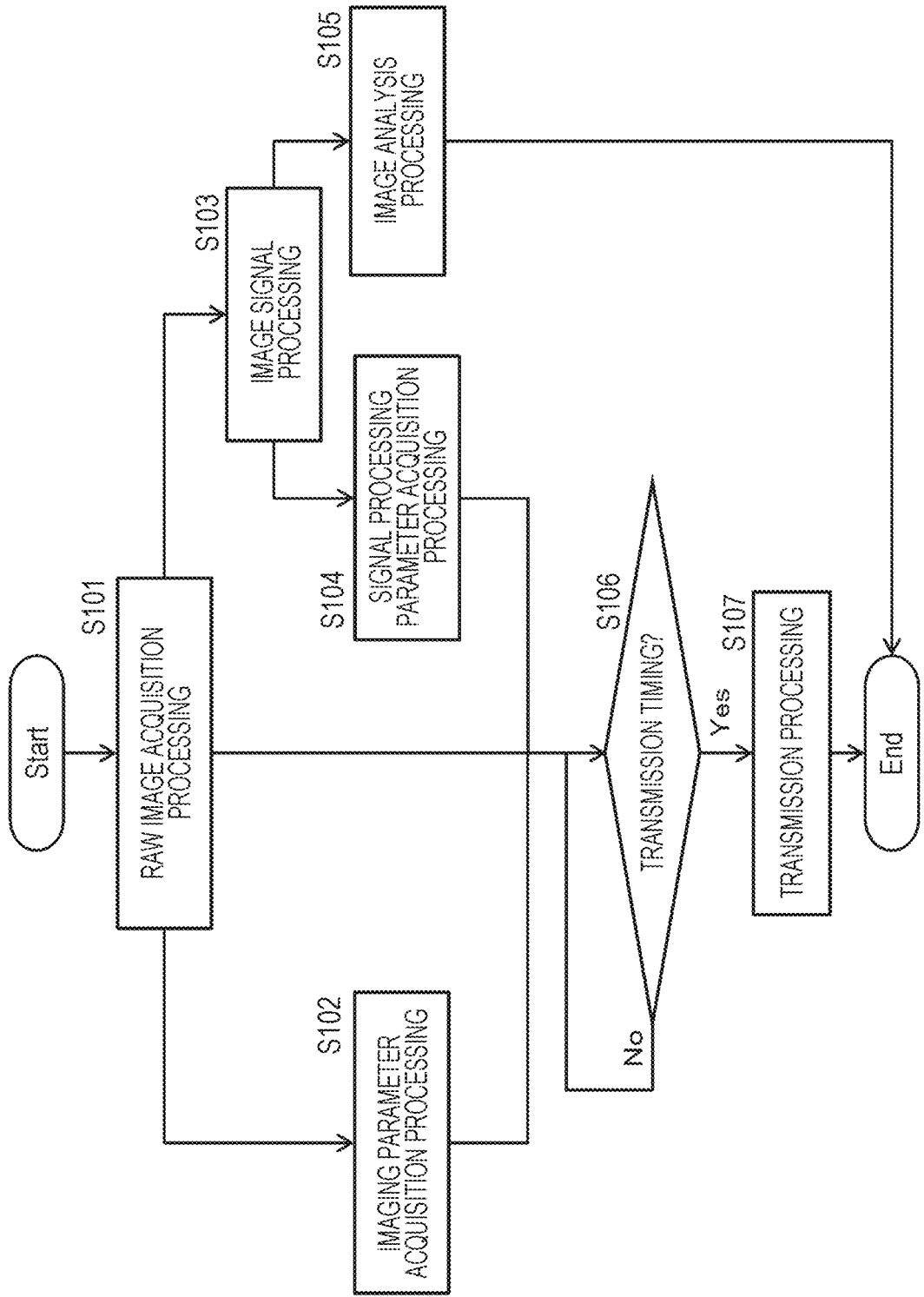
FIG. 3 is a diagram illustrating a flowchart for describing a processing sequence executed by the image processing device of the present disclosure.

Note that, the processing according to the flow illustrated in FIG. 3 can be executed according to, for example, a program stored in a storage unit of the image processing device 100, and is executed, for example, under the control of a control unit having a program execution function, such as a CPU. Hereinafter, the processing of each step of the flow illustrated in FIG. 3 will be described in sequence.

(Step S101)

First, the RAW image is acquired in step S101.

The RAW image which is an output from the imaging element (image sensor) of the imaging unit (camera) 101 illustrated in FIG. 3 is acquired.

(Step S102)

The processing of step S102 and the processing of steps S103 to S105 can be executed in parallel.

First, in step S102, the imaging parameter is acquired. This processing is processing executed by the parameter acquisition unit 104 illustrated in FIG. 3. The imaging parameter is a parameter at the time of capturing the image in the imaging unit (camera) 101, and is, for example, a parameter such as shutter speed and analog gain.

(Step S103)

Step S103 is the image signal processing executed by the image signal processor (ISP) 102 illustrated in FIG. 3. The image signal processor (ISP) 102 inputs the RAW image which is an output from the imaging element (image sensor)

of the imaging unit (camera) 101, and executes the image signal processing on the RAW image 111. For example, processing for generating a color image (for example, an RGB image), such as demosaicing processing for setting an RGB pixel value for each pixel and white balance adjustment processing is executed.

(Step S104)

In step S104, the signal processing parameter is acquired. This processing is processing executed by the parameter acquisition unit 104 illustrated in FIG. 3. The signal processing parameter is a signal processing parameter applied at the time of the image signal processing in the image signal processor 102, and is, for example, a parameter such as digital gain, a white balance (AWB) control value, and a high dynamic range (HDR) control value.

(Step S105)

Step S105 is image analysis processing executed by the image analysis unit 103. The image analysis unit 103 executes an image analysis using the RGB image generated by the image signal processor 102, and performs processing of detecting, for example, a person, an obstacle, or the like. The RGB image analysis result generated by the image analysis unit 103 is output to an output unit (display unit) and the like (not illustrated). For example, in a case where a person is detected, a warning display such as displaying a detection frame in a person area is performed.

(Step S106)

Step S106 is transmission timing determination processing, and is processing executed by the transmission timing control unit 107 illustrated in FIG. 3. The transmission timing control unit 107 decides the transmission timing of the transmission data to the server, that is, the RAW image, and the imaging parameter and the signal processing parameter of the RAW image. Specifically, the RAW image and the parameters are transmitted to the server at a transmission timing of constant intervals such as every N frames or every Msec.

In step S106, it is determined whether or not the specified transmission timing has been reached. In a case where it is determined that the specified transmission timing has been reached, the processing proceeds to step S107, and other than that, the processing stands by.

(Step S107)

In a case where it is determined in step S106 that the specified transmission timing has been reached, the processing proceeds to step S107. In step S107, the transmission unit 106 transmits the RAW image, the imaging parameter at the time of capturing the RAW image, and the signal processing parameter of the RAW image, to the server 20.

As described above, in Embodiment 1, since the configuration in which the transmission of the RAW image to the server is intermittently executed at constant intervals is adopted, it is possible to perform smooth processing without causing a data transfer delay and a processing delay without causing excessive use of the transfer bandwidth or the processing load on the automobile side.

(2-2. (Embodiment 2) Embodiment of Executing Transmission Necessity Determination of RAW Image Based on Parameter)

Next, as Embodiment 2 of the image processing device of the present disclosure, an embodiment of executing transmission necessity determination of the RAW image based on the parameters will be described with reference to FIG. 4 and subsequent drawings.

A configuration example of the image processing device 100 of Embodiment 2 will be described with reference to FIG. 4.

Figure 4:
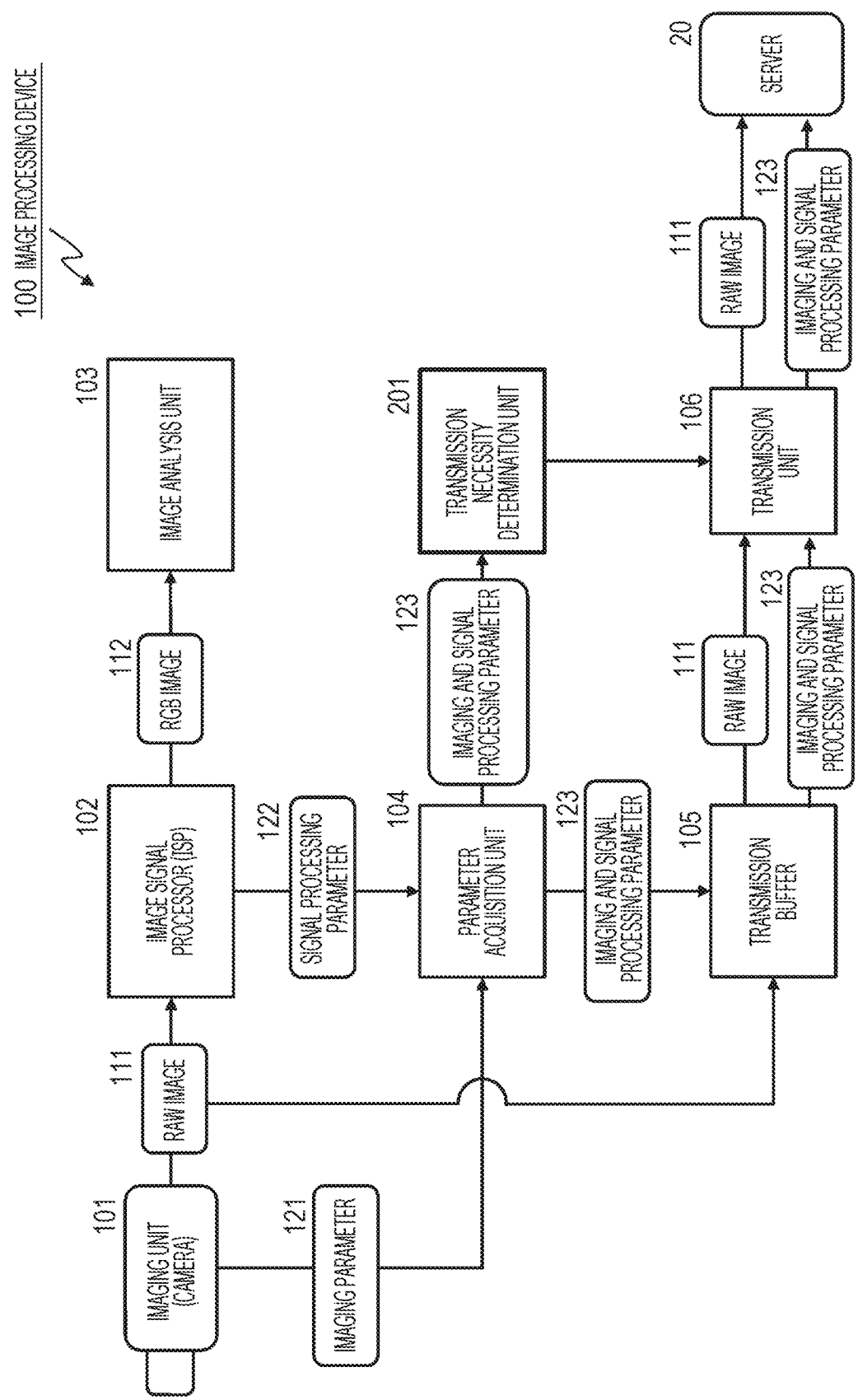
FIG. 4 is a diagram for describing a configuration example of the image processing device of the present disclosure.

The image processing device 100 illustrated in FIG. 4 has a configuration substantially similar to the image processing device 100 illustrated in FIG. 2 described above as (Embodiment 1). The difference is that the transmission timing control unit 107 illustrated in FIG. 2 is deleted and a transmission necessity determination unit 201 is added.

Since the other configurations are similar, the description thereof will be omitted, and only the difference from Embodiment 1 will be described.

The transmission necessity determination unit 201 inputs the parameter acquired from the parameter acquisition unit 104. That is, the transmission necessity determination unit 201 inputs the imaging and signal processing parameter 123 acquired from the parameter acquisition unit 104. The imaging and signal processing parameter 123 includes the imaging parameter 121 at the time of capturing the image in the imaging unit 101, and the signal processing parameter 122 in the image signal processor (ISP) 102.

For example, the imaging parameter includes shutter speed, analog gain, and the like. Further, the signal processing parameter includes digital gain, a white balance (AWB) control value, a high dynamic range (HDR) control value, and the like.

The transmission necessity determination unit 201 determines whether or not it is necessary to transmit the RAW image 111 and the imaging and signal processing parameter 123 to the server 20 on the basis of these parameters.

FIG. 5 illustrates an example of the parameters used in transmission necessity determination processing of data to the server 20. As illustrated in FIG. 5, there are the following parameters as parameters used in the transmission necessity determination processing of data to the server 20.

(1) Imaging parameter
  (1a) Shutter speed,
  (1b) Analog gain
(2) Signal processing parameter
  (2a) Digital gain
  (2b) White balance (AWB) control value
  (2c) Dynamic range (HDR) control value The transmission necessity determination unit 201 determines whether or not it is necessary to transmit the RAW image 111 and the imaging and signal processing parameter 123 to the server 20 on the basis of these parameters. For example, in a case where the shutter speed is low, there is a high possibility that the imaging has been performed in a dark environment such as at night. In such a case, the possibility that a highly accurate analysis result is obtained in the analysis of the RGB image is reduced. In this case, the settings are such that the RAW image and the parameter are transmitted to the server 20 and the server 20 executes the image analysis based on the RAW image.

Note that, the transmission necessity determination unit 201 stores a threshold value for each parameter illustrated in FIG. 5 in advance in a memory, and determines the transmission necessity of data transmission to the server by comparing the input parameter with the threshold value.

The determination result in the transmission necessity determination unit 201, that is, information regarding whether or not the transmission of the RAW image and the parameter to the server 20 is necessary is output to the transmission unit 106.

The transmission unit 106 acquires and transmits the RAW image 111 and the imaging and signal processing parameter 123 stored in the transmission buffer 105 to the server 20 only in a case where the determination result indicating that the transmission is necessary is input from the transmission necessity determination unit 201.

In Embodiment 2, the transmission necessity determination unit 201 determines whether or not the analysis based on the RAW image should be executed on the basis of the imaging parameter and the signal processing parameter, and transmits the RAW image 111 and the imaging and signal processing parameter 123 to the server 20 only in a case where it is determined that the analysis based on the RAW image should be executed.

In Embodiment 2, similar to Embodiment 1 described above, the transmission processing of the RAW images is selectively executed, and it is possible to perform smooth processing without causing a data transfer delay and a processing delay without causing excessive use of the transfer bandwidth or the processing load on the automobile side.

Next, the processing sequence of Embodiment 2 will be described with reference to the flowchart illustrated in FIG. 6.

Figure 6:
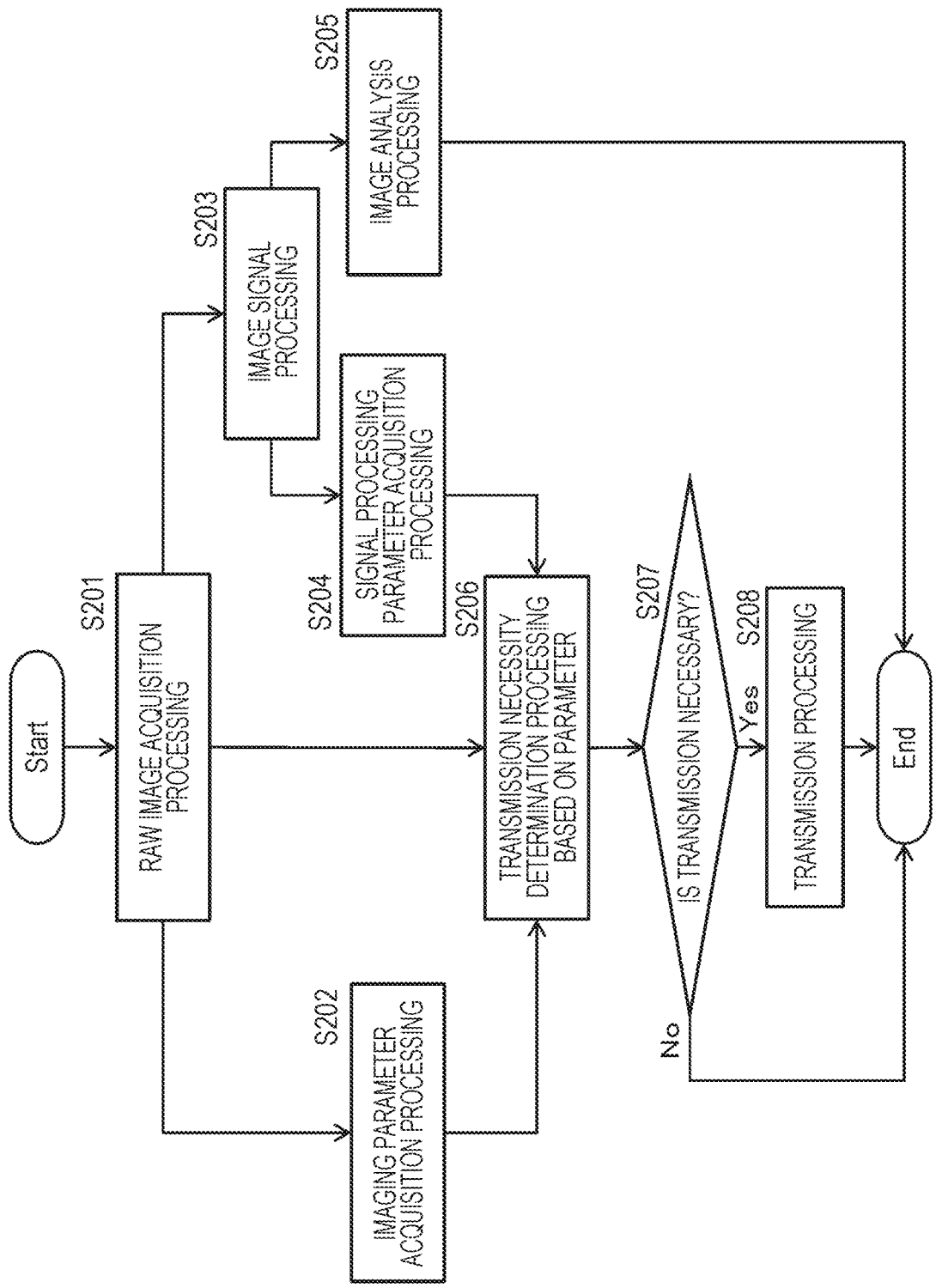
FIG. 6 is a diagram illustrating a flowchart for describing a processing sequence executed by the image processing device of the present disclosure.

Note that, the processing according to the flow illustrated in FIG. 6 can be executed according to, for example, a program stored in a storage unit of the image processing device 100, and is executed, for example, under the control of a control unit having a program execution function, such as a CPU. Hereinafter, the processing of each step of the flow illustrated in FIG. 6 will be described in sequence.

(Steps S201 to S205)

The processing of steps S201 to S205 are similar to the processing of steps S101 to S105 of the flow illustrated in FIG. 3 described in Embodiment 1, which will be briefly described.

First, the RAW image is acquired in step S201.

The RAW image which is an output from the imaging element (image sensor) of the imaging unit (camera) 101 illustrated in FIG. 4 is acquired.

Next, in step S202, the parameter acquisition unit 104 acquires a parameter at the time of capturing the image in the imaging unit (camera) 101, for example, a parameter such as shutter speed and analog gain.

Further, in step S203, the image signal processor (ISP) 102 performs image signal processing on the RAW image. For example, processing of generating a color image (for example, an RGB image), such as demosaicing processing and white balance adjustment processing is executed.

In step S204, the parameter acquisition unit 104 acquires a signal processing parameter applied to the image signal processing in the image signal processor 102, for example, a parameter such as digital gain, a white balance (AWB) control value, and a high dynamic range (HDR) control value.

Step S205 is image analysis processing using the RGB image in the image analysis unit 103. For example, processing of detecting a person, an obstacle, or the like is performed. An RGB image analysis result generated by the image analysis unit 103 is output to an output unit (display unit) and the like (not illustrated). For example, in a case where a person is detected, a warning display such as displaying a detection frame in a person area is performed.

(Steps S206 and S207)

Steps S206 and S207 are steps of determining the transmission necessity of the RAW image to the server based on the imaging and signal processing parameter 123, which is executed by the transmission necessity determination unit 201 illustrated in FIG. 4.

The transmission necessity determination unit 201 inputs the imaging and signal processing parameter 123 acquired from the parameter acquisition unit 104. The imaging and signal processing parameter 123 includes the imaging parameter 121 at the time of capturing the image in the imaging unit 101, and the signal processing parameter 122 in the image signal processor (ISP) 102. As described with reference to FIG. 5, the parameters are as follows:

(1) Imaging parameter
    (1a) Shutter speed
    (1b) Analog gain
(2) Signal processing parameter
    (2a) Digital gain
    (2b) White balance (AWB) control value
    (2c) Dynamic range (HDR) control value.

The transmission necessity determination unit 201 determines whether or not it is necessary to transmit the RAW image 111 and the imaging and signal processing parameter 123 to the server 20 on the basis of these parameters. For example, the transmission necessity determination unit 201 determines the transmission necessity of data to the server by comparing the input parameter with the threshold value. As described above, in a case where the shutter speed is low, there is a high possibility that the imaging has been performed in a dark environment such as at night. In such a case, the possibility that a highly accurate analysis result is obtained in the analysis of the RGB image is reduced. In this case, the settings are such that the RAW image and the parameter are transmitted to the server 20 and the server 20 executes the image analysis based on the RAW image.

(Step S208)

In a case where the transmission necessity determination unit 201 determines in step S207 that the transmission is necessary, the processing proceeds to step S208. In step S208, the transmission unit 106 acquires and transmits the RAW image 111 and the imaging and signal processing parameter 123 stored in the transmission buffer 105 to the server 20.

In Embodiment 2, similar to Embodiment 1 described above, the transmission processing of the RAW images is selectively executed, and it is possible to perform smooth processing without causing a data transfer delay and a processing delay without causing excessive use of the transfer bandwidth or the processing load on the automobile side.

(2-3. (Embodiment 3) Embodiment of Executing Transmission Necessity Determination of RAW Image Based on Image Analysis Result)

Next, as Embodiment 3 of the image processing device of the present disclosure, an embodiment of executing transmission necessity determination of the RAW image based on the image analysis result will be described with reference to FIG. 7 and subsequent drawings.

A configuration example of the image processing device 100 of Embodiment 3 will be described with reference to FIG. 7.

Figure 7:
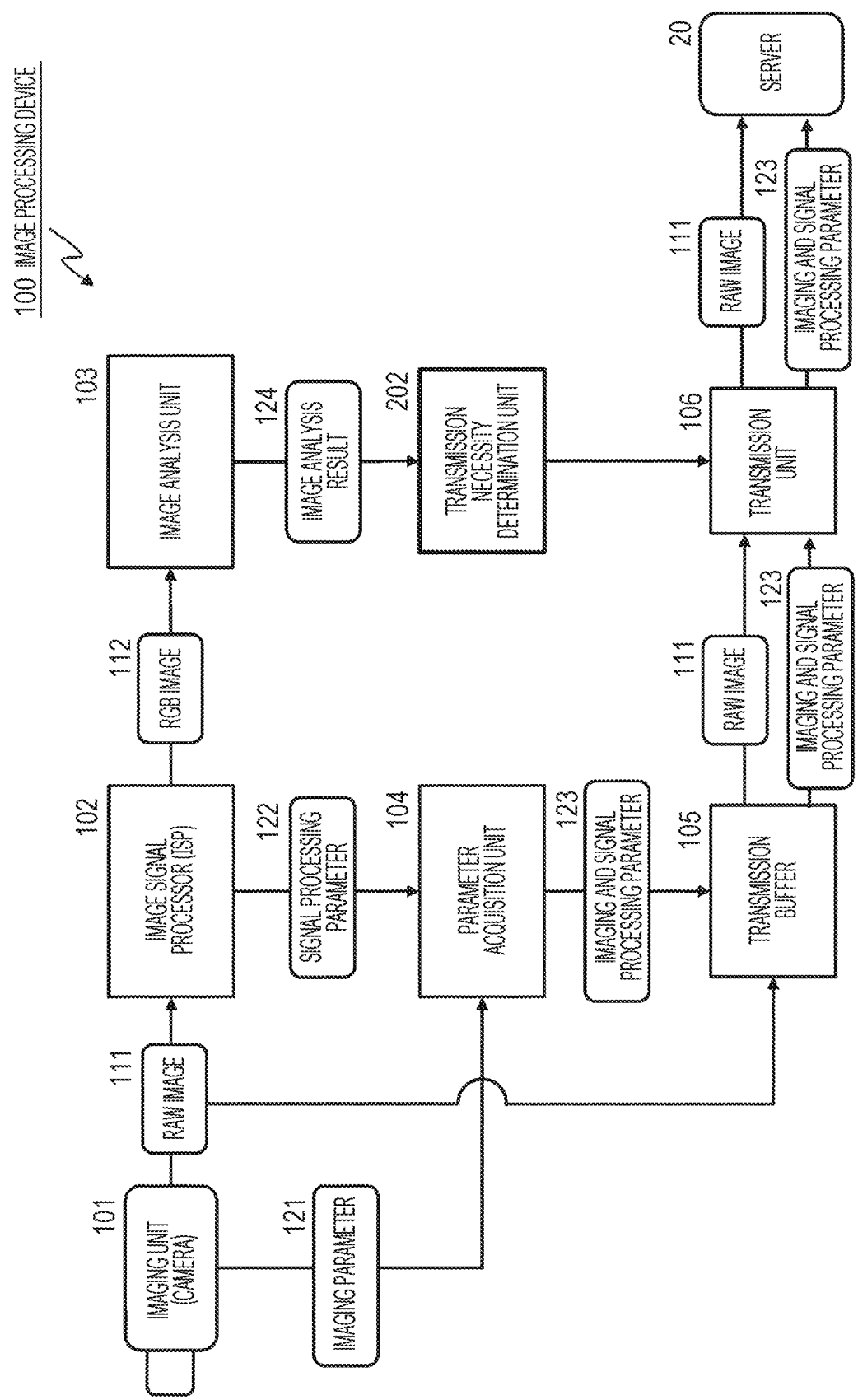
FIG. 7 is a diagram for describing a configuration example of the image processing device of the present disclosure.

The image processing device 100 illustrated in FIG. 7 has a configuration substantially similar to the image processing device 100 illustrated in FIG. 2 described above as (Embodiment 1). The difference is that the transmission timing control unit 107 illustrated in FIG. 2 is deleted and a transmission necessity determination unit 202 is added.

Since the other configurations are similar, the description thereof will be omitted, and only the difference from Embodiment 1 will be described.

The transmission necessity determination unit 202 inputs an image analysis result 124 generated by the image analysis unit 103. The transmission necessity determination unit 202 determines whether or not it is necessary to transmit the RAW image 111 and the imaging and signal processing parameter 123 to the server 20 on the basis of the image analysis result 124 generated by the image analysis unit 103.

An example of configuration data of the image analysis result 124 generated by the image analysis unit 103 will be described with reference to FIG. 8.

The image analysis result 124 generated by the image analysis unit 103 includes, for example, the following data.
 (1) Recognition result certainty degree
 (2) Recognition class (1) The recognition result certainty degree is a certainty degree regarding the type of the object identified from the image. For example, the certainty degree indicates whether or not the identified object is a person.

The recognition result certainty degree will be described with reference to (Specific Example 1) illustrated in the lower part of FIG. 8.

In a case where a certain object is detected from the image as the analysis target, the type of the object is estimated by, for example, executing pattern matching or the like on the object.

The example illustrated in (Specific Example 1) is an example in which two objects are detected from the image. The object on the left side has a high matching rate with the pattern for the person stored in the memory in advance, and a recognition score of 0.99 is obtained as the image analysis result. In this case, it is determined that the certainty degree that the object type is a person is high.

On the other hand, the object on the right side does not have a very high matching rate with the pattern for the person, and a recognition score of 0.59 is obtained as the image analysis result. In this case, it is determined that the certainty degree that the object type is a person is low.

For example, the transmission necessity determination unit 202 compares a predetermined threshold value with the recognition score acquired as the image analysis result, and in a case where a recognition score equal to or lower than the threshold value is obtained, the transmission necessity determination unit 202 determines that the transmission of the RAW image to the server 20 is necessary in order to cause the server 20 to execute a highly accurate analysis based on the RAW image.

Further, (2) the recognition class is a class that defines the type of the object identified from the image, and corresponds to the object type such that the object is a person, a dog, or an automobile, for example.

In a case where the recognition class is difficult to decide, or in a case where the recognition class is a rare class, the transmission necessity determination unit 202 determines that the transmission of the RAW image to the server 20 is necessary in order to cause the server 20 to execute a highly accurate analysis based on the RAW image.

Figure 8:
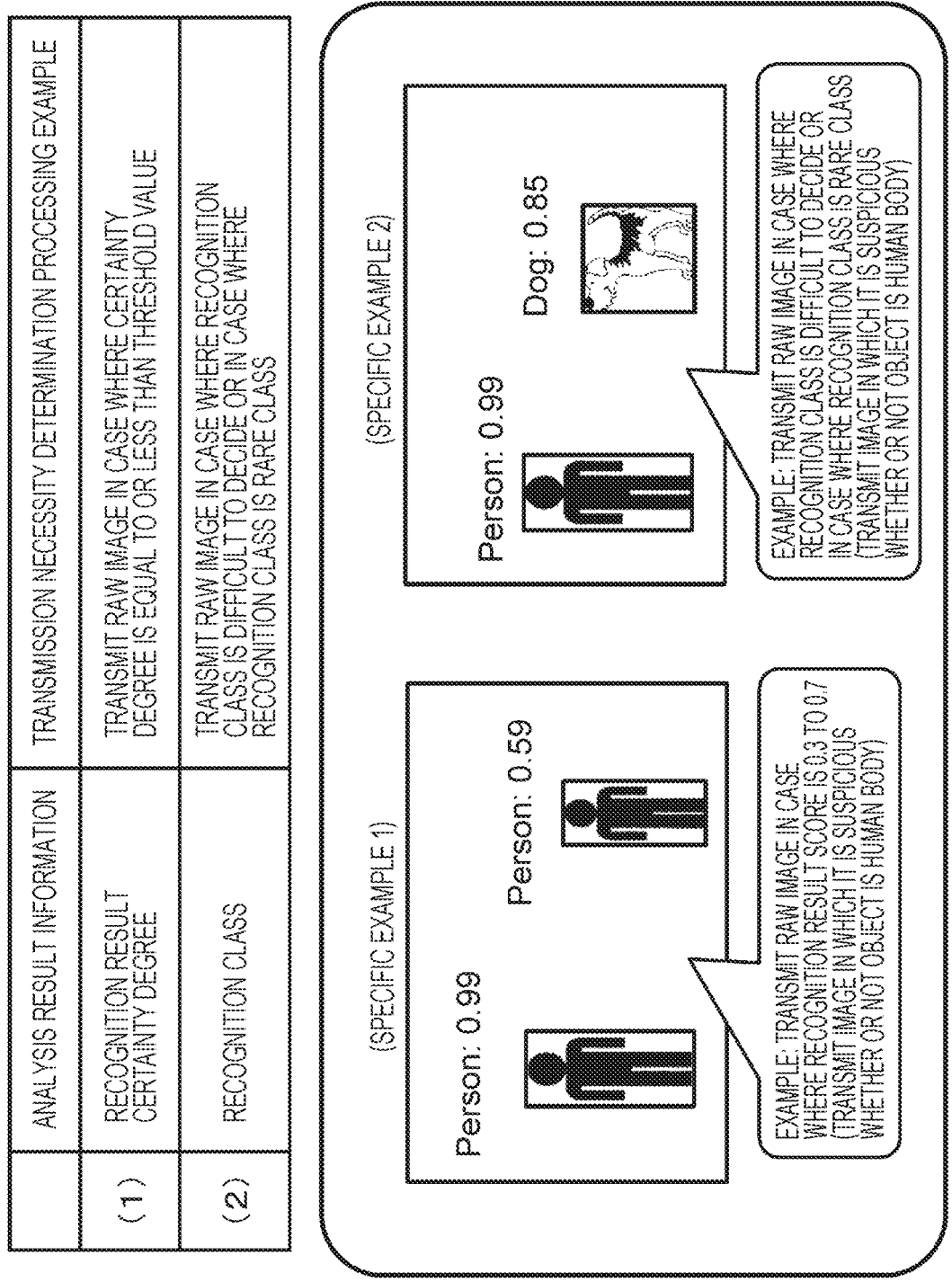
FIG. 8 is a diagram for describing an example of analysis result information generated by an image analysis unit.

In (Specific Example 2) in lower part of FIG. 8, a dog (Dog) is detected as a detected object.

The recognition score corresponding to the certainty degree is 0.85 which is high, but since the object is unlikely to be detected on the road, that is, the rare class is a dog, the transmission necessity determination unit 202 determines that the transmission of the RAW image to the server 20 is necessary in order to cause the server 20 to execute a highly accurate analysis based on the RAW image.

In this way, the transmission necessity determination unit 202 inputs the image analysis result of the image analysis unit 103, and determines the transmission necessity of the RAW image 111 and the imaging and signal processing parameter 123 to the server 20 on the basis of the image analysis result.

As described above, in Embodiment 3, the transmission necessity determination unit 202 determines the transmission necessity of the RAW image 111 and the imaging and signal processing parameter 123 to the server 20 on the basis of the image analysis result of the image analysis unit 103. In addition to the data illustrated in FIG. 8, the image analysis result used for this determination includes, for example, an analysis result by semantic segmentation, an analysis result using a distance image, a recognition result using a human body recognition device, and the like.

The semantic segmentation is a technology to identify what category each constituent pixel of an image belongs to on the basis of the degree of matching between the object in the image and dictionary data (learned data) for object identification based on various actual object shapes and other feature information.

For example, (S1) a road surface is extracted using the semantic segmentation and the distance images, (S2) road surface position information corresponding to the current position is acquired from map information, and (S3) in a case where the road surface positions acquired in (S1) and (S2) deviate from each other by a predetermined threshold value or more, the RAW image is transmitted to the server so that a highly accurate analysis based on the RAW image is performed.

In addition, collision prediction is performed from the recognition result using the human body recognition device, and in a case where a collision risk is high, the RAW image is transmitted to the server so that a highly accurate analysis based on the RAW image is performed.

Moreover, the image analysis result that can be used by the transmission necessity determination unit 202 includes, for example, coordinate data indicating an object detection position, a feature quantity of the object, distance data corresponding to the difference from the learning data applied to the object detection, and the like.

For example, in a case where the difference between the object detected by the image analysis processing and the learning data is large, the RAW image is transmitted to the server so that a highly accurate analysis based on the RAW image is performed.

Further, settings can be made such that even in a case where a person object is detected and the detected person is different from a person registered in the database in advance, the RAW image is transmitted to the server so that an analysis is executed.

Note that, the transmission necessity determination unit 202 stores a threshold value corresponding to each piece of data of the image analysis result output from the image analysis unit 103 in the memory, and determines the transmission necessity of data to the server by comparing the input result data with the threshold value.

The determination result in the transmission necessity determination unit 202, that is, information regarding whether or not the transmission of the RAW image and the parameter to the server 20 is necessary is output to the transmission unit 106.

The transmission unit 106 acquires and transmits the RAW image 111 and the imaging and signal processing parameter 123 stored in the transmission buffer 105 to the server 20 only in a case where the determination result indicating that the transmission is necessary is input from the transmission necessity determination unit 202.

In Embodiment 3, the transmission necessity determination unit 202 determines whether or not the analysis based on the RAW image should be executed on the basis of the image analysis result generated by the image analysis unit 103, and transmits the RAW image 111 and the imaging and signal processing parameter 123 to the server 20 only in a case where it is determined that the analysis based on the RAW image should be executed.

In Embodiment 3, similar to Embodiments 1 and 2 described above, the transmission processing of the RAW images is selectively executed, and it is possible to perform smooth processing without causing a data transfer delay and a processing delay without causing excessive use of the transfer bandwidth or the processing load on the automobile side.

Next, the processing sequence of Embodiment 3 will be described with reference to the flowchart illustrated in FIG. 9.

Figure 9:
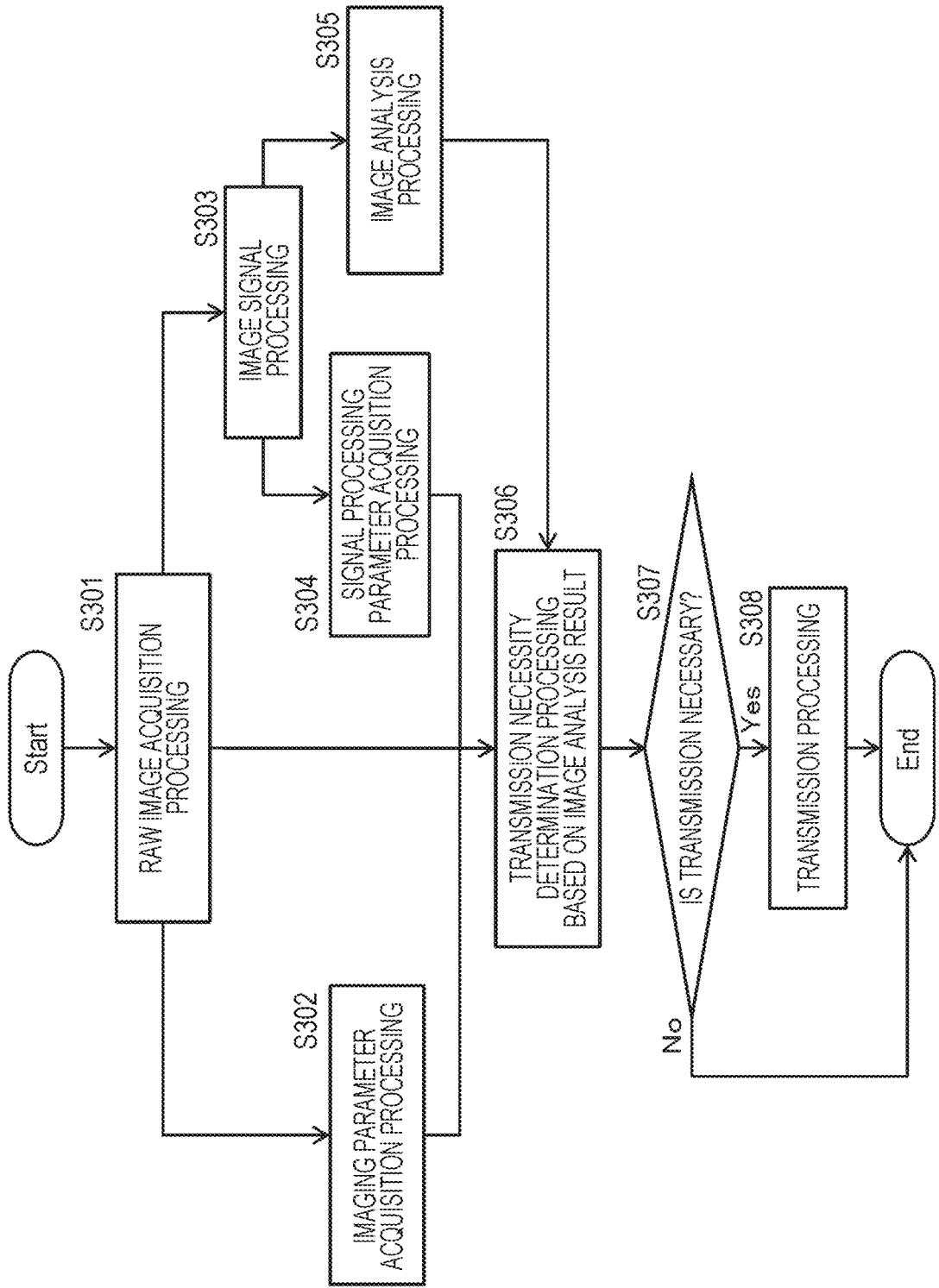
FIG. 9 is a diagram illustrating a flowchart for describing a processing sequence executed by the image processing device of the present disclosure.

Note that, the processing according to the flow illustrated in FIG. 9 can be executed according to, for example, a program stored in a storage unit of the image processing device 100, and is executed, for example, under the control of a control unit having a program execution function, such as a CPU. Hereinafter, the processing of each step of the flow illustrated in FIG. 9 will be described in sequence.

(Steps S301 to S305)

The processing of steps S301 to S305 are similar to the processing of steps S101 to S105 of the flow illustrated in FIG. 3 described in Embodiment 1, which will be briefly described.

First, the RAW image is acquired in step S301.

The RAW image which is an output from the imaging element (image sensor) of the imaging unit (camera) 101 illustrated in FIG. 7 is acquired.

Next, in step S302, the parameter acquisition unit 104 acquires a parameter at the time of capturing the image in the imaging unit (camera) 101, for example, a parameter such as shutter speed and analog gain.

Further, in step S303, the image signal processor (ISP) 102 performs image signal processing on the RAW image. For example, processing of generating a color image (for example, an RGB image), such as demosaicing processing and white balance adjustment processing is executed.

In step S304, the parameter acquisition unit 104 acquires a signal processing parameter applied to the image signal processing in the image signal processor 102, for example, a parameter such as digital gain, a white balance (AWB) control value, and a high dynamic range (HDR) control value.

Step S305 is image analysis processing using the RGB image in the image analysis unit 103. For example, processing of detecting a person, an obstacle, or the like is performed. An RGB image analysis result generated by the image analysis unit 103 is output to an output unit (display unit) and the like (not illustrated). For example, in a case where a person is detected, a warning display such as displaying a detection frame in a person area is performed.

(Steps S306 and S307)

Steps S306 and S307 are steps of determining the transmission necessity of the RAW image to the server based on the image analysis result 124 generated by the image analysis unit 103, which is executed by the transmission necessity determination unit 202 illustrated in FIG. 7.

The transmission necessity determination unit 202 inputs an image analysis result 124 generated by the image analysis unit 103. As described with reference to FIG. 8, the image analysis result 124 includes the analysis result data, for example, (1) Recognition result certainty degree
(2) Recognition class.

The transmission necessity determination unit 202 determines whether or not it is necessary to transmit the RAW image 111 and the imaging and signal processing parameter 123 to the server 20 on the basis of the image analysis result 124 generated by the image analysis unit 103. As described with reference to FIG. 8, for example, in a case where the recognition result certainty degree is lower than the threshold value, in a case where the recognition class is difficult to decide, or in a case where the recognition class is a rare class, the RAW image and the parameter are transmitted to the server 20 so that the server 20 executes an image analysis based on the RAW image.

(Step S308)

In a case where the transmission necessity determination unit 202 determines in step S307 that the transmission is necessary, the processing proceeds to step S308. In step S308, the transmission unit 106 acquires and transmits the RAW image 111 and the imaging and signal processing parameter 123 stored in the transmission buffer 105 to the server 20.

In Embodiment 3, similar to Embodiments 1 and 2 described above, the transmission processing of the RAW images is selectively executed, and it is possible to perform smooth processing without causing a data transfer delay and a processing delay without causing excessive use of the transfer bandwidth or the processing load on the automobile side.

Figure 10:
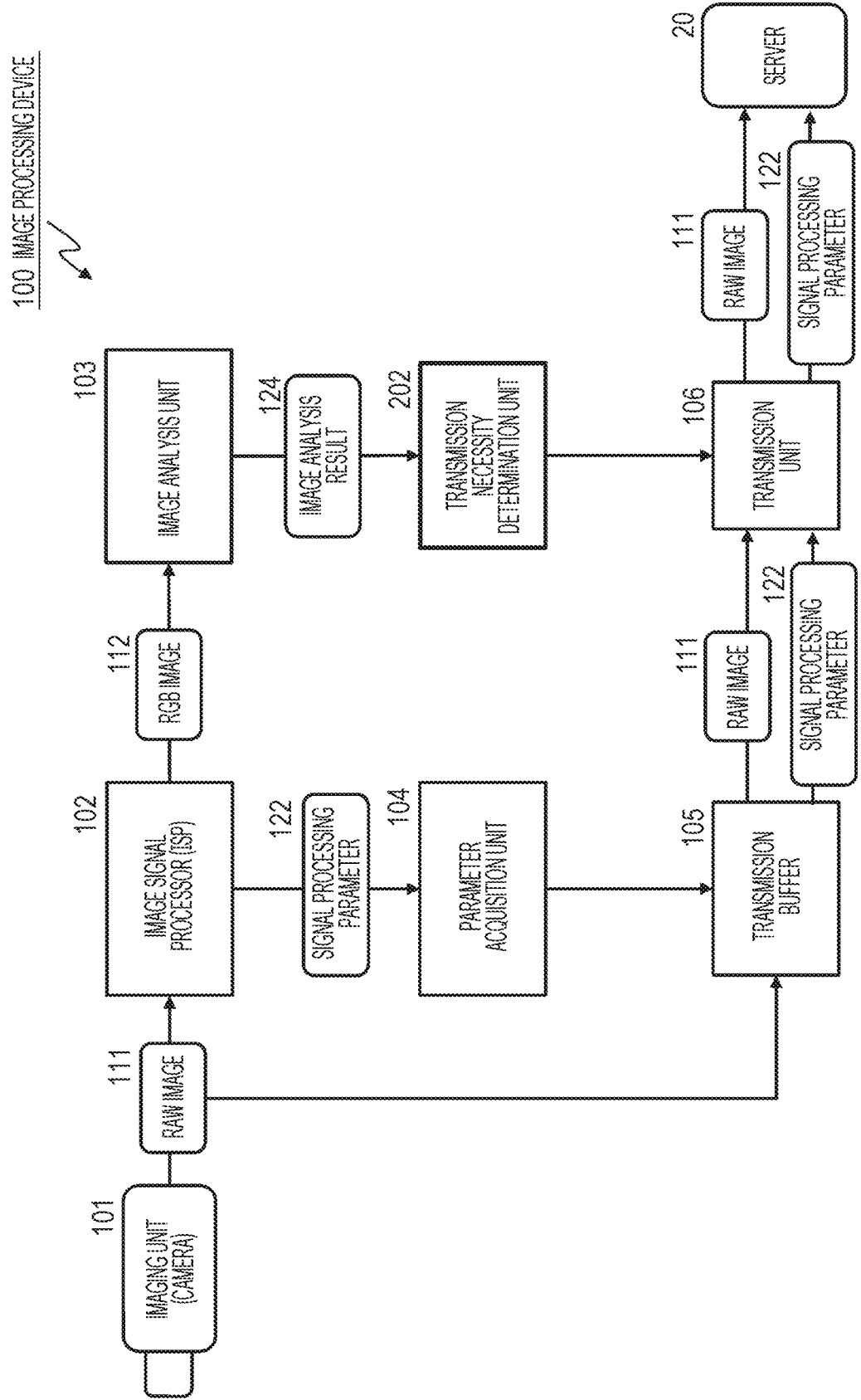
FIG. 10 is a diagram for describing a configuration example of the image processing device of the present disclosure.

Note that, as a modification example of Embodiment 3, for example, a configuration as illustrated in FIG. 10 is also possible.

The image processing device 100 illustrated in FIG. 10 has a configuration in which the parameter acquisition unit 104 acquires only the signal processing parameter 122 from the image signal processor 102. That is, the acquisition of the imaging parameter from the imaging unit 101 is omitted.

In the configuration illustrated in FIG. 10, only the signal processing parameter 122 acquired by the parameter acquisition unit 104 is transmitted to the server 20 together with the RAW image 111.

Note that, as a reverse configuration, a configuration is also possible in which the parameter acquisition unit 104 acquires only the imaging parameter from the imaging unit 101 and only the imaging parameter is transmitted to the server 20 together with the RAW image 111.

(2-4. (Embodiment 4) Embodiment of Executing Transmission Necessity Determination of RAW Image Based on Device Information)

Next, as Embodiment 4 of the image processing device of the present disclosure, an embodiment of executing transmission necessity determination of the RAW image based on the device information will be described with reference to FIG. 11 and subsequent drawings.

A configuration example of the image processing device 100 of Embodiment 4 will be described with reference to FIG. 11.

Figure 11:
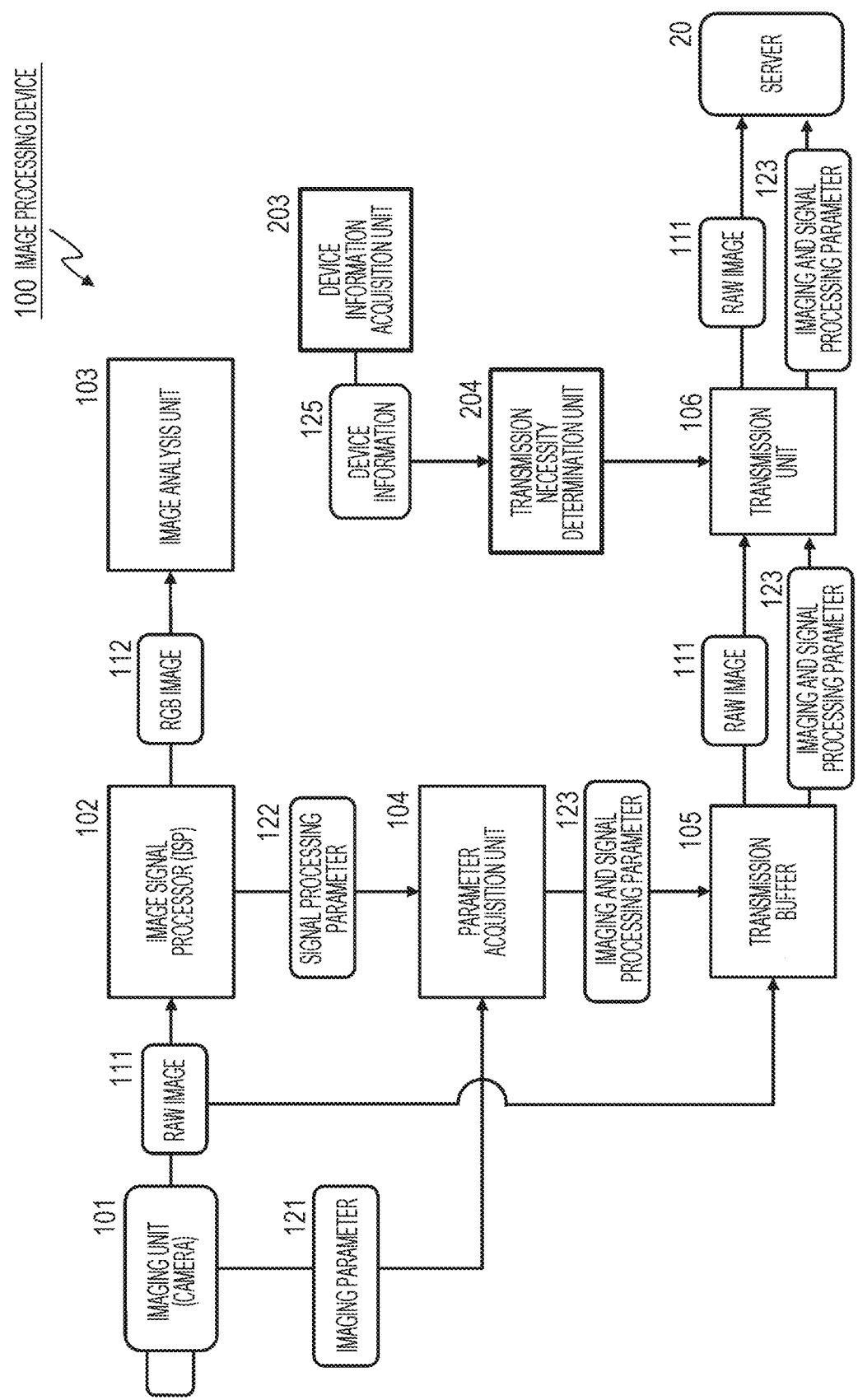
FIG. 11 is a diagram for describing a configuration example of the image processing device of the present disclosure.

The image processing device 100 illustrated in FIG. 11 has a configuration substantially similar to the image processing device 100 illustrated in FIG. 2 described above as (Embodiment 1). The difference is that the transmission timing control unit 107 illustrated in FIG. 2 is deleted and a device information acquisition unit 203 and a transmission necessity determination unit 204 are added.

Since the other configurations are similar, the description thereof will be omitted, and only the difference from Embodiment 1 will be described.

The device information acquisition unit 203 acquires various kinds of device information 125 of the image processing device 100 to be applied to the transmission necessity determination of the RAW image, and outputs the device information 125 to the transmission necessity determination unit 204. The transmission necessity determination unit 204 determines whether or not the transmission of the RAW image 111 and the imaging and signal processing parameter 123 to the server 20 is necessary on the basis of the device information 125 acquired by the device information acquisition unit 203.

An example of the device information 125 acquired by the device information acquisition unit 203 will be described with reference to FIG. 12.

As illustrated in FIG. 12, the device information 125 acquired by the device information acquisition unit 203 includes, for example, the following information.

(1) Information flowing in bus
(2) Number of defective pixels in imaging element
(3) Abnormality detection information of signal processor and the like (1) The information flowing in the bus is information flowing in a bus in the image processing device 100. In addition to the data used for normal data processing, for example, an error message such as failure information or the like output by each component connected to the bus also flows in the bus.

An error message is input to a control unit that executes control of the image processing device 100, for example, and measures for reducing the influence of the error, such as error repair processing or temporary data processing suspension under the control of the control unit.

For example, in a case where an error message such as failure information is included in the information flowing in the bus which is acquired by the device information acquisition unit 203, the transmission necessity determination unit 204 determines that the image analysis in the image processing device 100 may not be executed correctly, and determines that the transmission of the RAW image to the server 20 is necessary in order to cause the server 20 to execute a highly accurate analysis based on the RAW image.

(2) The number of defective pixels of the imaging element is the number of defective pixels of the imaging element (image sensor) of the imaging unit (camera) 101 of the image processing device 100. The number of defective pixels is recorded in the memory of the image processing device 100 and is updated. The device information acquisition unit 203 acquires this information, and outputs this information to the transmission necessity determination unit 204. The transmission necessity determination unit 204 compares a predetermined threshold value with the number of defective pixels, and in a case where the number of defective pixels is equal to or greater than the threshold value, the transmission necessity determination unit 204 determines that the image analysis in the image processing device 100 may not be executed correctly, and determines that the transmission of the RAW image to the server 20 is necessary in order to cause the server 20 to execute a highly accurate analysis based on the RAW image.

(3) The abnormality detection information of the signal processor and the like is, for example, check result information of a built-in test (Built in Test) or the like which is check processing performed in each data processor such as the image signal processor 102, specifically, check processing based on the test data. This check result is executed in each data processor, and the result information is recorded in the memory in the image processing device 100. The device information acquisition unit 203 acquires this information, and outputs this information to the transmission necessity determination unit 204. In a case where the abnormality detection information is included in the check result information, the transmission necessity determination unit 204 determines that the image analysis in the image processing device 100 may not be executed correctly, and determines that the transmission of the RAW image to the server 20 is necessary in order to cause the server 20 to execute a highly accurate analysis based on the RAW image.

The determination result in the transmission necessity determination unit 204, that is, information regarding whether or not the transmission of the RAW image and the parameter to the server 20 is necessary is output to the transmission unit 106.

The transmission unit 106 acquires and transmits the RAW image 111 and the imaging and signal processing parameter 123 stored in the transmission buffer 105 to the server 20 only in a case where the determination result indicating that the transmission is necessary is input from the transmission necessity determination unit 202.

In Embodiment 4, the transmission necessity determination unit 204 determines whether or not the analysis based on the RAW image should be executed in the server 20 on the basis of the device information 125 acquired by the device information acquisition unit 203, and transmits the RAW image 111 and the imaging and signal processing parameter 123 to the server 20 only in a case where it is determined that the analysis based on the RAW image should be executed.

In Embodiment 4, similar to Embodiments 1 and 2 described above, the transmission processing of the RAW images is selectively executed, and it is possible to perform smooth processing without causing a data transfer delay and a processing delay without causing excessive use of the transfer bandwidth or the processing load on the automobile side.

Next, the processing sequence of Embodiment 4 will be described with reference to the flowchart illustrated in FIG. 13.

Note that, the processing according to the flow illustrated in FIG. 13 can be executed according to, for example, a program stored in a storage unit of the image processing device 100, and is executed, for example, under the control of a control unit having a program execution function, such as a CPU. Hereinafter, the processing of each step of the flow illustrated in FIG. 13 will be described in sequence.

(Steps S401 to S405)

The processing of steps S401 to S405 are similar to the processing of steps S101 to S105 of the flow illustrated in FIG. 3 described in Embodiment 1, which will be briefly described.

First, the RAW image is acquired in step S401.

The RAW image which is an output from the imaging element (image sensor) of the imaging unit (camera) 101 illustrated in FIG. 11 is acquired.

Next, in step S402, the parameter acquisition unit 104 acquires a parameter at the time of capturing the image in the imaging unit (camera) 101, for example, a parameter such as shutter speed and analog gain.

Further, in step S403, the image signal processor (ISP) 102 performs image signal processing on the RAW image.

For example, processing of generating a color image (for example, an RGB image), such as demosaicing processing and white balance adjustment processing is executed.

In step S404, the parameter acquisition unit 104 acquires a signal processing parameter applied to the image signal processing in the image signal processor 102, for example, a parameter such as digital gain, a white balance (AWB) control value, and a high dynamic range (HDR) control value.

Step S405 is image analysis processing using the RGB image in the image analysis unit 103. For example, processing of detecting a person, an obstacle, or the like is performed. An RGB image analysis result generated by the image analysis unit 103 is output to an output unit (display unit) and the like (not illustrated). For example, in a case where a person is detected, a warning display such as displaying a detection frame in a person area is performed.

(Steps S406 and S407)

Steps S406 and S407 are processing executed by the device information acquisition unit 203 and the transmission necessity determination unit 204 illustrated in FIG. 11, and steps of determining the transmission necessity of the RAW image to the server based on the device information 125 acquired by the device information acquisition unit 203.

For example, as described with reference to FIG. 12, the device information acquisition unit 203 illustrated in FIG. 11 acquires information, and outputs the information to the transmission necessity determination unit 204, and the information is as follows:

(1) Information flowing in bus
(2) Number of defective pixels in imaging element
(3) Abnormality detection information of signal processor and the like The transmission necessity determination unit 204 determines whether or not it is necessary to transmit the RAW image 111 and the imaging and signal processing parameter 123 to the server 20 on the basis of the device information. As described with reference to FIG. 12, for example, in a case where the error information is included in the information flowing in the bus, in a case where the number of defective pixels of the imaging element is equal to or greater than the threshold value, or in a case where the abnormality detection information is detected from the signal processor and the like, the RAW image and the parameter are transmitted to the server 20 so that the server 20 executes an image analysis based on the RAW image.

(Step S408)

In a case where the transmission necessity determination unit 204 determines in step S407 that the transmission is necessary, the processing proceeds to step S408. In step S408, the transmission unit 106 acquires and transmits the RAW image 111 and the imaging and signal processing parameter 123 stored in the transmission buffer 105 to the server 20.

In Embodiment 4, similar to Embodiments 1 to 3 described above, the transmission processing of the RAW images is selectively executed, and it is possible to perform smooth processing without causing a data transfer delay and a processing delay without causing excessive use of the transfer bandwidth or the processing load on the automobile side.

(2-5. (Embodiment 5) Embodiment of Executing Transmission Necessity Determination of RAW Image Based on Color Image Analysis Result on Server)

Next, as Embodiment 5 of the image processing device of the present disclosure, an embodiment of executing transmission necessity determination of the RAW image based on the analysis result of a color image such as an RGB image in the server will be described with reference to FIG. 14 and subsequent drawings.

A configuration example of the image processing device 100 of Embodiment 5 will be described with reference to FIGS. 14 and 15.

Figure 14:
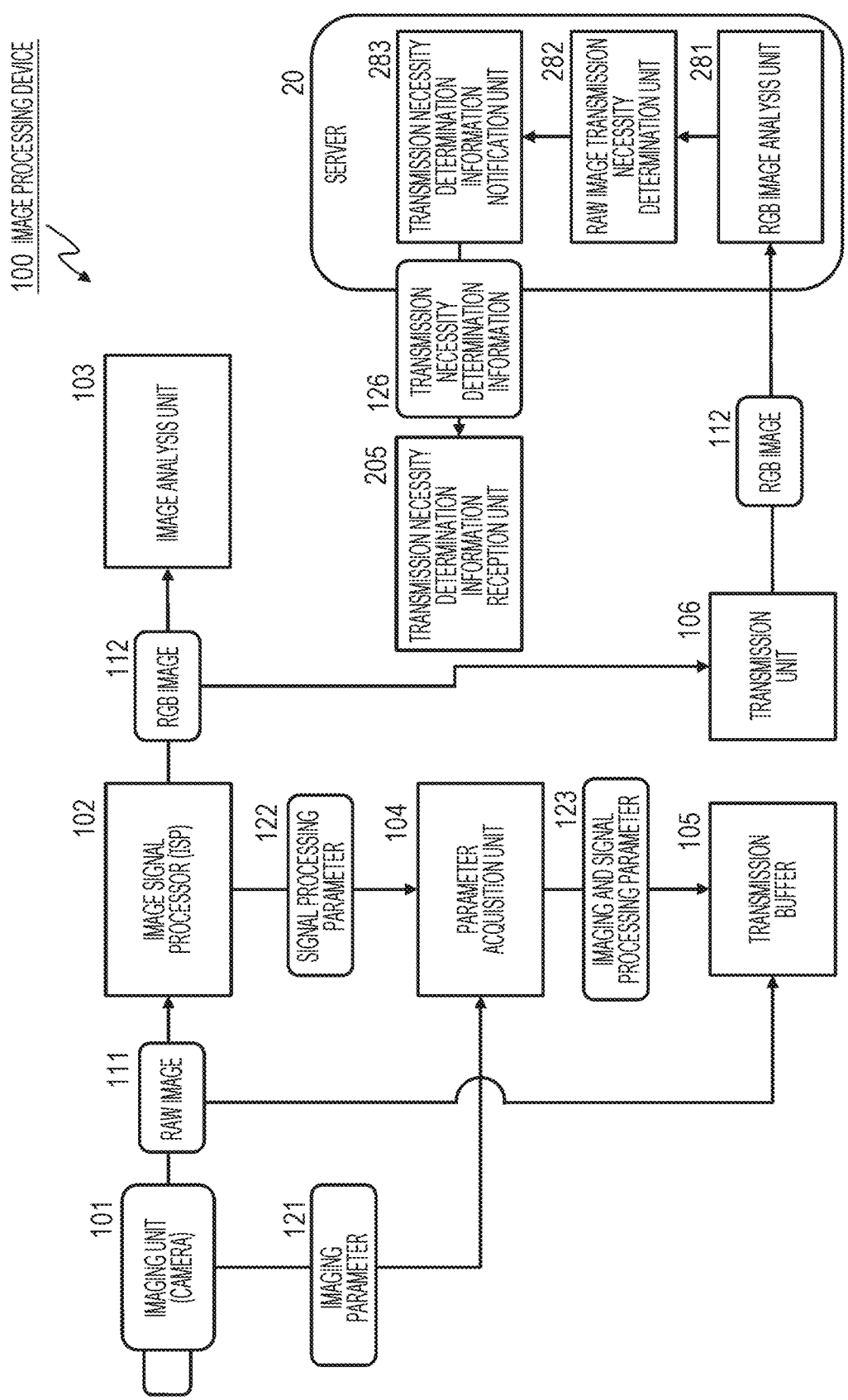
FIG. 14 is a diagram for describing a configuration example of the image processing device of the present disclosure.
Figure 15:
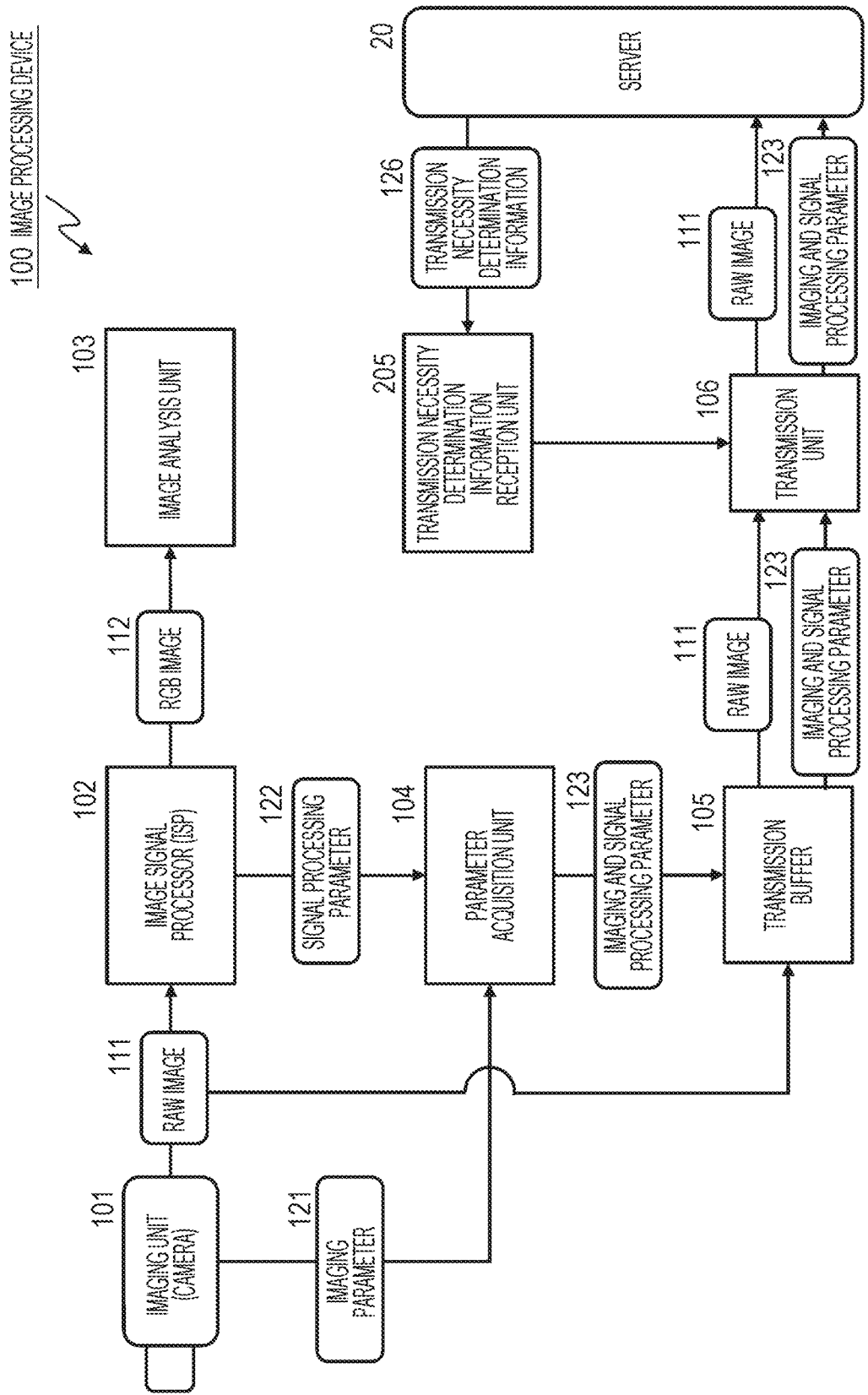
FIG. 15 is a diagram for describing a configuration example of the image processing device of the present disclosure.

FIGS. 14 and 15 are diagrams for describing processing of two phases of the image processing device 100 of Embodiment 5. The configuration itself is the same in both FIGS. 14 and 15.

FIG. 14 is a diagram for describing a phase in which the image processing device 100 transmits the RGB image 112 to the server 20.

FIG. 15 is a diagram for describing a phase in which the image processing device 100 subsequently transmits the RAW image 111 and the imaging and signal processing parameter 123 to the server 20.

The image processing device 100 illustrated in FIGS. 14 and 15 has a configuration substantially similar to the image processing device 100 illustrated in FIG. 2 described above as (Embodiment 1). The difference is that the transmission timing control unit 107 illustrated in FIG. 2 is deleted and a transmission necessity determination information reception unit 205 that functions as the transmission necessity determination unit is added.

Since the other configurations are similar, the description thereof will be omitted, and only the difference from Embodiment 1 will be described.

The transmission necessity determination information reception unit 205 receives transmission necessity determination information 126 of the RAW image from the server 20.

That is, in Embodiment 5, the server 20 executes the transmission necessity determination processing of the RAW image. As illustrated in FIG. 14, first, the image processing device 100 transmits the RGB image 112 generated by the image signal processor (ISP) 102 to the server 20 via the transmission unit 106.

The server 20 executes image analysis processing of the RGB image 112 received from the image processing device 100.

An RGB image analysis unit 281 in the server 20 illustrated in FIG. 14 executes the image analysis processing of the RGB image 112 received from the image processing device 100. The analysis result is input to a RAW image transmission necessity determination unit 282, and the transmission necessity of the RAW image is determined on the basis of an RGB image analysis result. For example, in a case where there is no unclear part in the RGB image analysis result and a sufficient analysis result is obtained, the analysis of the RAW image is not necessary, and it is determined that the transmission of the RAW image is not necessary. On the other hand, in a case where there is an unclear part in the RGB image analysis result, the analysis of the RAW image is necessary, and it is determined that the transmission of the RAW image is necessary.

The transmission necessity determination information 126, which is the determination result of the RAW image transmission necessity determination unit 282, is notified to the transmission necessity determination information reception unit 205 of the image processing device 100 via a transmission necessity determination information notification unit 283.

The processing up to this point is illustrated in FIG. 14.

In a case where the transmission necessity determination information 126 received from the server 20 by the transmission necessity determination information reception unit 205 of the image processing device 100 is information indicating "transmission unnecessary" of the RAW image, the transmission of the RAW image from the image processing device 100 to the server 20 is not executed.

On the other hand, in a case where the transmission necessity determination information 126 received from the server 20 by the transmission necessity determination information reception unit 205 of the image processing device 100 is information indicating "transmission necessary" of the RAW image, the transmission of the RAW image from the image processing device 100 to the server 20 is executed. FIG. 15 is a diagram for describing a phase in which the RAW image is transmitted from the image processing device 100 to the server 20.

As illustrated in FIG. 15, the transmission necessity determination information 126 is input from the server 20 to the transmission necessity determination information reception unit 205 of the image processing device 100.

In a case where the transmission necessity determination information reception unit 205 receives the transmission necessity determination information 126, the transmission necessity determination information reception unit 205 outputs the transmission necessity determination information 126 to the transmission unit 106.

The transmission unit 106 acquires and transmits the RAW image 111 and the imaging and signal processing parameter 123 stored in the transmission buffer 105 to the server 20 only in a case where the transmission necessity determination information 126 is information indicating that the transmission of the RAW image is necessary.

In Embodiment 5, the server 20 determines whether or not the transfer and the analysis of the RAW image are necessary on the basis of the RGB image analysis result in the server 20, and the image processing device 100 decides whether or not the transmission of the RAW image is executed according to the determination result. The image processing device 100 transmits the RAW image 111 and the imaging and signal processing parameter 123 to the server 20 only in a case where the server 20 determines that the analysis based on the RAW image should be executed.

In Embodiment 5, similar to Embodiments 1 to 4 described above, the transmission processing of the RAW images is selectively executed, and it is possible to perform smooth processing without causing a data transfer delay and a processing delay without causing excessive use of the transfer bandwidth or the processing load on the automobile side.

Next, the processing sequence of Embodiment 5 will be described with reference to the flowchart illustrated in FIG. 16.

Figure 16:
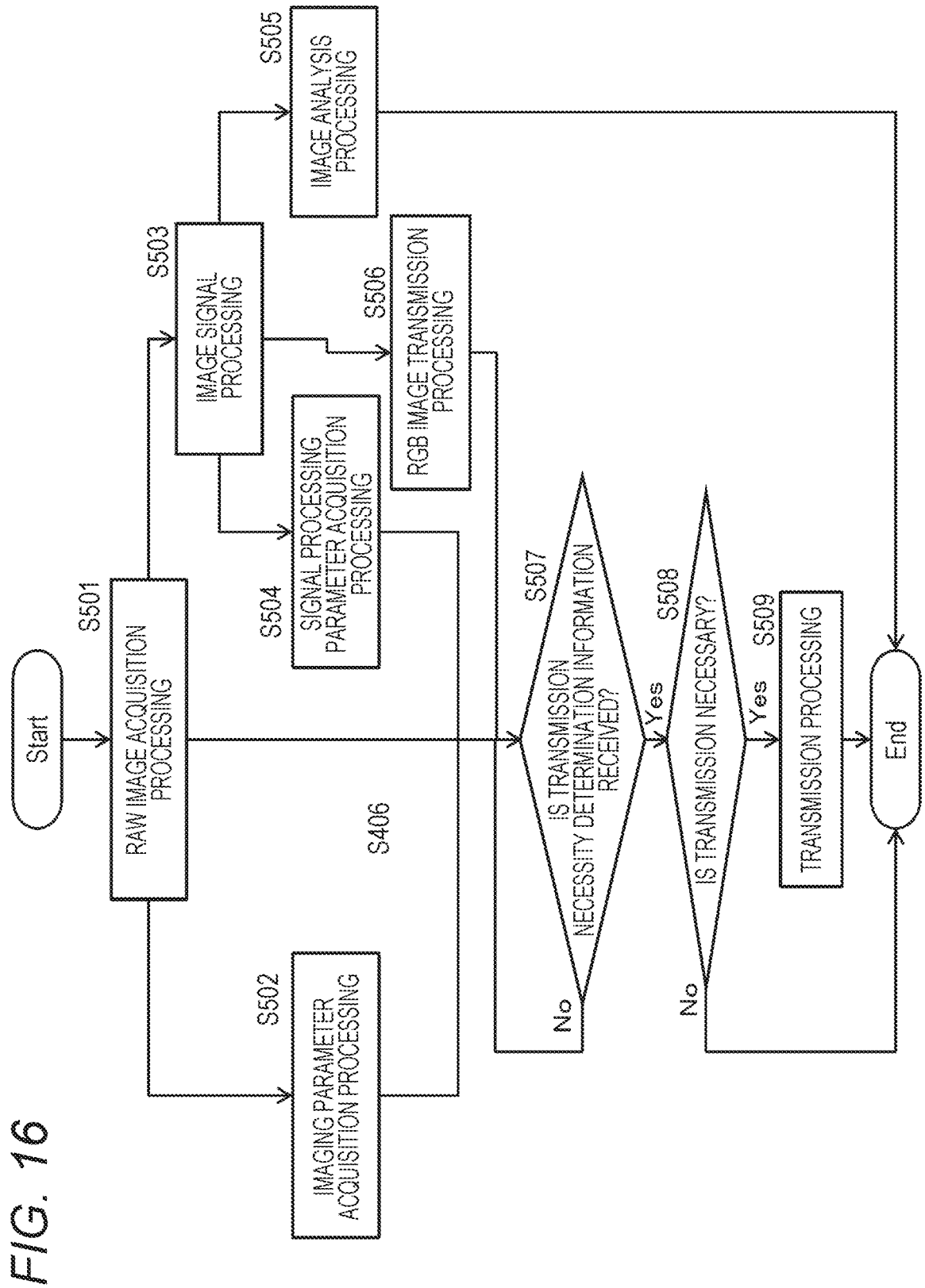
FIG. 16 is a diagram illustrating a flowchart for describing a processing sequence executed by the image processing device of the present disclosure.

Note that, the processing according to the flow illustrated in FIG. 16 can be executed according to, for example, a program stored in a storage unit of the image processing device 100, and is executed, for example, under the control of a control unit having a program execution function, such as a CPU. Hereinafter, the processing of each step of the flow illustrated in FIG. 16 will be described in sequence.

(Steps S501 to S505)

The processing of steps S501 to S505 are similar to the processing of steps S101 to S105 of the flow illustrated in FIG. 3 described in Embodiment 1, which will be briefly described.

First, the RAW image is acquired in step S501.

The RAW image which is an output from the imaging element (image sensor) of the imaging unit (camera) 101 illustrated in FIGS. 14 and 15 is acquired.

Next, in step S502, the parameter acquisition unit 104 acquires a parameter at the time of capturing the image in the imaging unit (camera) 101, for example, a parameter such as shutter speed and analog gain.

Further, in step S503, the image signal processor (ISP) 102 performs image signal processing on the RAW image. For example, processing of generating a color image (for example, an RGB image), such as demosaicing processing and white balance adjustment processing is executed.

In step S504, the parameter acquisition unit 104 acquires a signal processing parameter applied to the image signal processing in the image signal processor 102, for example, a parameter such as digital gain, a white balance (AWB) control value, and a high dynamic range (HDR) control value.

Step S505 is image analysis processing using the RGB image in the image analysis unit 103. For example, processing of detecting a person, an obstacle, or the like is performed. An RGB image analysis result generated by the image analysis unit 103 is output to an output unit (display unit) and the like (not illustrated). For example, in a case where a person is detected, a warning display such as displaying a detection frame in a person area is performed.

(Step S506)

Step S506 is a transmission processing step of the RGB image. This is a step of transmitting the RGB image 112 generated by the image signal processor (ISP) 102 illustrated in FIG. 14 to the server 20 via the transmission unit 106.

(Steps S507 and S508)

Steps S507 and S508 are processing executed by the transmission necessity determination information reception unit 205 of the image processing device 100 illustrated in FIG. 14. The transmission necessity determination information reception unit 205 decides the transmission necessity of the RAW image on the basis of the transmission necessity determination information 126 received from the server 20.

In a case where the transmission necessity determination information 126 received from the server 20 by the transmission necessity determination information reception unit 205 is information indicating "transmission necessary" of the RAW image, the transmission of the RAW image from the image processing device 100 to the server 20 is executed. On the other hand, in a case where the transmission necessity determination information 126 received from the server 20 is information indicating "transmission unnecessary" of the RAW image, the transmission of the RAW image from the image processing device 100 to the server 20 is not executed.

(Step S509)

In step S508, in a case where the transmission necessity determination information reception unit 205 determines that the transmission is necessary on the basis of the transmission necessity determination information 126 received from the server 20, the processing proceeds to step S509. In step S509, the transmission unit 106 acquires and transmits the RAW image 111 and the imaging and signal processing parameter 123 stored in the transmission buffer 105 to the server 20.

In Embodiment 5, similar to Embodiments 1 to 4 described above, the transmission processing of the RAW images is selectively executed, and it is possible to perform smooth processing without causing a data transfer delay and a processing delay without causing excessive use of the transfer bandwidth or the processing load on the automobile side.

Although the plurality of embodiments has been described above, the plurality of embodiments is not limited to the configurations of the individual embodiments, and a configuration in which any plurality of embodiments is combined may be adopted.

3. Regarding Hardware Configuration Example of Image Processing Device

Figure 17:
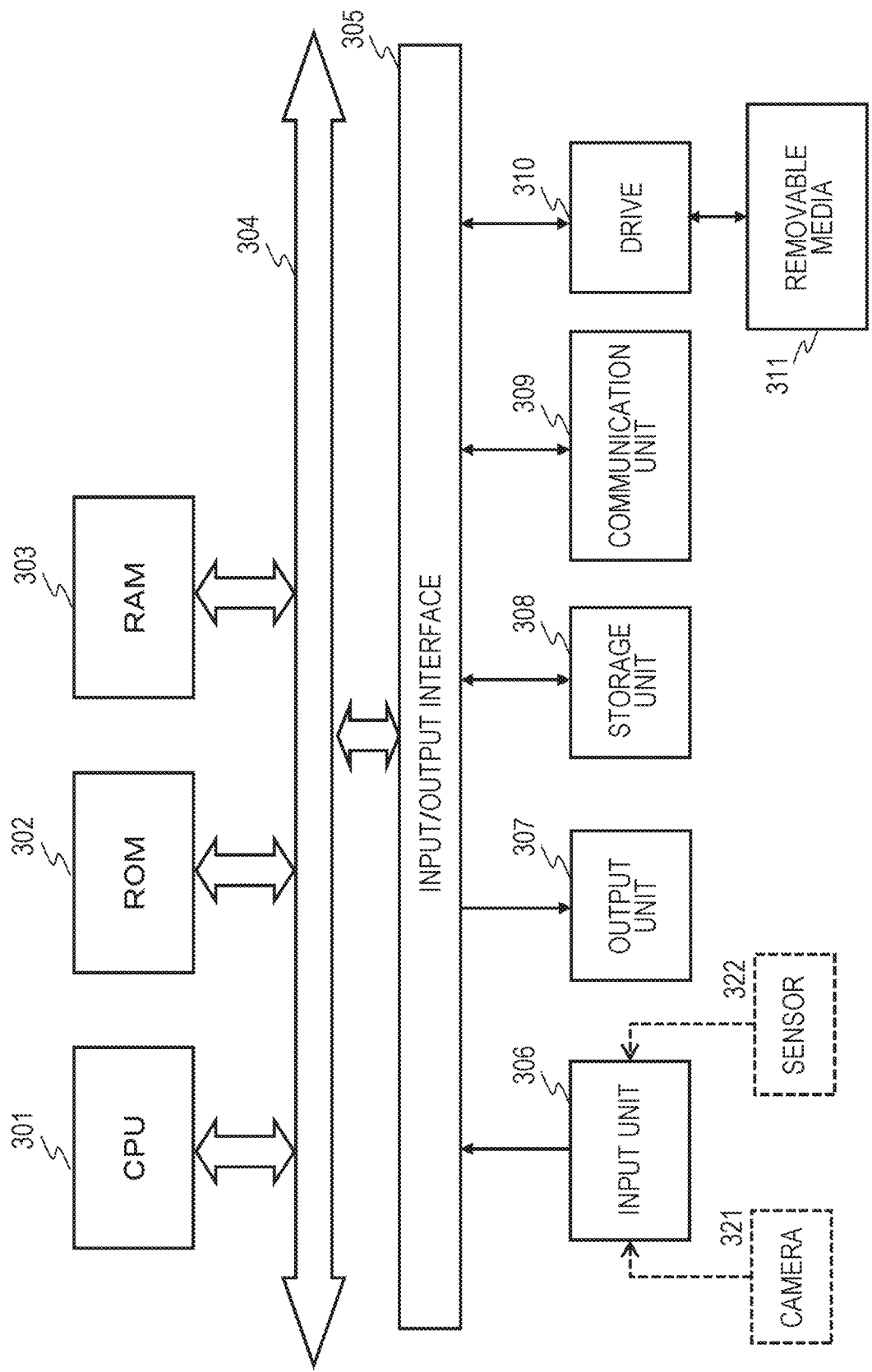
FIG. 17 is a diagram for describing a hardware configuration example of the image processing device.

FIG. 17 is a diagram illustrating an example of a hardware configuration of the image processing device 100 that executes the above-described processing.

A central processing unit (CPU) 301 functions as a data processor that executes various kinds of processing according to a program stored in a read only memory (ROM) 302 or a storage unit 308. For example, the processing according to the sequence described in the above-described embodiments is executed. A random access memory (RAM) 303 stores programs executed by the CPU 301, data, and the like. These CPU 301, ROM 302, and RAM 303 are connected to each other by a bus 304.

The CPU 301 is connected to an input/output interface 305 via the bus 304, and an input unit 306 including various switches, a keyboard, a touch panel, a mouse, a microphone, and moreover, a status data acquisition unit such as a sensor, a camera, and a GPS, and an output unit 307 including a display, a speaker, and the like are connected to the input/output interface 305.

Note that, input information from a camera 321 and a sensor 322 such as a distance sensor is also input to the input unit 306.

The CPU 301 inputs a command, status data, and the like input from the input unit 306, executes various kinds of processing, and outputs the processing result to, for example, the output unit 307.

The storage unit 308 connected to the input/output interface 305 includes, for example, a hard disk or the like, and stores programs executed by the CPU 301 and various kinds of data. A communication unit 309 functions as a transmission/reception unit for data communication via a network such as the Internet or a local area network, and communicates with an external device.

A drive 310 connected to the input/output interface 305 drives a removable medium 311 such as a magnetic disk, an optical disk, a magneto-optical disk, or a semiconductor memory such as a memory card, and executes recording or reading of data.

Note that, as the hardware configuration of the server 20, for example, a configuration in which the camera 321 and the sensor 322 such as the distance sensor are omitted from the configuration illustrated in FIG. 17 can be applied.

4. Summary of Configuration of Present Disclosure

The embodiments of the present disclosure have been described above in detail with reference to the specific embodiments. However, it is obvious that those skilled in the art can modify or substitute the embodiments without departing from the scope of the present disclosure. That is, the present invention has been disclosed in the form of exemplification and should not be limitedly interpreted. In order to determine the scope of the present disclosure, the claims should be taken into consideration.

Note that, the technology disclosed in this specification can have the following configurations.

(1) An image processing device including:
  an image signal processor that executes signal processing on a RAW image which is an output of an imaging element of an imaging unit, and generates a color image;
  an image analysis unit that executes analysis processing of the color image generated by the image signal processor;
  a transmission necessity determination unit that decides whether or not the RAW image is to be transmitted to an external server; and
  a transmission unit that transmits the RAW image to the external server according to a determination result of the transmission necessity determination unit.

(2) The image processing device according to (1),
  in which the transmission necessity determination unit executes a transmission timing control such that transmission processing of the RAW image to the external server is performed at predetermined time intervals or frame interval units.

(3) The image processing device according to (1) or (2),
  in which the transmission necessity determination unit decides transmission necessity of the RAW image to the external server on the basis of at least any parameter of an imaging parameter of the RAW image or a signal processing parameter that is applied to the RAW image by the image signal processor.

(4) The image processing device according to (3),
  in which the imaging parameter and the signal processing parameter include at least any of shutter speed, analog gain, digital gain, a white balance control value, or a high dynamic range control value.

(5) The image processing device according to any one of (1) to (4),
  in which the transmission necessity determination unit decides transmission necessity of the RAW image to the external server on the basis of analysis result information in the image analysis unit.

(6) The image processing device according to (5),
  in which the analysis result information in the image analysis unit includes at least any information of a recognition result certainty degree or a recognition class corresponding to a detected object from the color image.

(7) The image processing device according to any one of (1) to (6),
  in which the transmission necessity determination unit decides transmission necessity of the RAW image to the external server on the basis of device information of the image processing device.

(8) The image processing device according to (7),
  in which the device information includes at least any information of information flowing in a bus of the image processing device, a number of defective pixels of the imaging element, or abnormality detection information of the image processing device.

(9) The image processing device according to any one of (1) to (8),
  in which the transmission necessity determination unit decides transmission necessity of the RAW image to the external server on the basis of RAW image transmission necessity determination information input from the server.

(10) The image processing device according to (9),
  in which the RAW image transmission necessity determination information input from the server is determination information based on an analysis result of the server with respect to the color image that is transmitted to the server from the image processing device.

(11) The image processing device according to any one of (1) to (10), in which the transmission necessity determination unit decides whether or not at least any parameter of an imaging parameter of the RAW image or a signal processing parameter that is applied to the RAW image by the image signal processor is to be transmitted to the external server together with the RAW image.

(12) The image processing device according to any one of (1) to (11),
in which the transmission unit transmits at least any parameter of an imaging parameter of the RAW image or a signal processing parameter that is applied to the RAW image by the image signal processor to the external server together with the RAW image.

(13) A movable device including:
an imaging unit that is mounted on the movable device;
an image signal processor that executes signal processing on a RAW image which is an output of an imaging element of the imaging unit, and generates a color image;
an image analysis unit that executes analysis processing of the color image generated by the image signal processor;
a transmission necessity determination unit that decides whether or not the RAW image is to be transmitted to an external server; and
a transmission unit that transmits the RAW image to the external server according to a determination result of the transmission necessity determination unit.

(14) The movable device according to (13),
in which the transmission necessity determination unit executes transmission timing control processing such that transmission processing of the RAW image to the external server is performed at predetermined time intervals or frame interval units.

(15) The movable device according to (13) or (14),
in which the transmission necessity determination unit decides transmission necessity of the RAW image to the external server on the basis of at least any information of
at least any parameter of an imaging parameter of the RAW image or a signal processing parameter that is applied to the RAW image by the image signal processor,
analysis result information in the image analysis unit,
device information of the image processing device, or
RAW image transmission necessity determination information input from the server.

(16) An image processing system including:
an image processing device; and
a server,
in which the image processing device includes
an image signal processor that executes signal processing on a RAW image which is an output of an imaging element of an imaging unit, and generates a color image,
an image analysis unit that executes analysis processing of the color image generated by the image signal processor,
a transmission necessity determination unit that decides whether or not the RAW image is to be transmitted to an external server, and
a transmission unit that transmits the RAW image to the external server according to a determination result of the transmission necessity determination unit, and
the server receives the RAW image from the image processing device and executes analysis processing of the RAW image.

(17) An image processing method executed in an image processing device, the image processing method including:
an image signal processing step of causing an image signal processor to execute signal processing on a RAW image which is an output of an imaging element of an imaging unit, and to generate a color image;
an image analysis step of causing an image analysis unit to execute analysis processing of the color image generated in the image signal processing step;
a transmission necessity determination step of causing a transmission necessity determination unit to decide whether or not the RAW image is to be transmitted to an external server; and
a transmission step of causing a transmission unit to transmit the RAW image to the external server according to a determination result of the transmission necessity determination step.

(18) A program causing an image processing device to execute image processing, the program causing:
an image signal processor to execute an image signal processing step of executing signal processing on a RAW image which is an output of an imaging element of an imaging unit, and generating a color image;
an image analysis unit to execute an image analysis step of executing analysis processing of the color image generated in the image signal processing step;
a transmission necessity determination unit to execute a transmission necessity determination step of deciding whether or not the RAW image is to be transmitted to an external server; and
a transmission unit to execute a transmission step of transmitting the RAW image to the external server according to a determination result of the transmission necessity determination step.

Further, the series of processing described in the specification can be executed by hardware, software, or a combined configuration of hardware and software. In a case of executing the processing by software, the program in which the processing sequence is recorded can be executed by being installed in the memory in the computer incorporated in the dedicated hardware, or the program can be executed by being installed in a general-purpose computer capable of executing various kinds of processing. For example, the program can be recorded in a recording medium in advance. In addition to the installing of the program in the computer from the recording medium, the program can be installed in the recording medium such as a built-in hard disk by being received via a network such as a local area network (LAN) or the Internet.

Note that, the various kinds of processing described in the specification may be executed not only in time series according to the description but also in parallel or individually according to the processing capability of the device that executes the processing or as needed. Further, in the present specification, the system is a logical set configuration of a plurality of devices, and is not limited to a system in which the devices of the respective configurations are in the same housing.

INDUSTRIAL APPLICABILITY

As described above, according to the configuration of one embodiment of the present disclosure, a configuration is realized in which only RAW images selected according to specified conditions are selected and transmitted to a server in a case where a highly accurate image analysis is required, for example.

Specifically, for example, there are provided an imaging unit that is mounted on a movable device, an image signal processor that generates a color image by signal processing of the RAW image which is an output of an imaging element of the imaging unit, an image analysis unit that executes analysis processing of the color image, a transmission necessity determination unit that determines transmission necessity of the RAW image to the server, and a transmission unit that transmits the RAW image to the external server according to a determination result. The transmission necessity determination unit decides the transmission necessity of the RAW image on the basis of a transmission timing control at constant intervals, imaging and signal processing parameters, an image analysis result, device information, or the like.

With the configuration, a configuration is realized in which only RAW images selected according to specified conditions are selected and transmitted to a server in a case where a highly accurate image analysis is required, for example.

REFERENCE SIGNS LIST

10 Automobile
11 Camera
12 Image signal processor (ISP)
13 Image analysis unit
20 Server
21 Image analysis unit
22 Learning processor
23 Learning data storage unit
30 Network
100 Image processing device
101 Imaging unit (camera)
102 Image signal processor (ISP)
103 Image analysis unit
104 Parameter acquisition unit
105 Transmission buffer
106 Transmission unit
107 Transmission timing control unit
201 Transmission necessity determination unit
202 Transmission necessity determination unit
203 Device information acquisition unit
204 Transmission necessity determination unit
205 Transmission necessity determination information reception unit
281 RGB image analysis unit
282 RAW image transmission necessity determination unit
283 Transmission necessity determination information notification unit
301 CPU
302 ROM
303 RAM
304 Bus
305 Input/output interface
306 Input unit
307 Output unit
308 Storage unit
309 Communication unit
310 Drive
311 Removable medium
321 Camera
322 Sensor

The invention claimed is:

1. An image processing device, comprising:
processing circuitry configured to
execute signal processing on a RAW image which is an output of a camera, and generate a color image,
execute analysis processing of the color image,
determine whether or not the RAW image is to be transmitted to an external server based on analysis result information, wherein the analysis result information includes a combination of a recognition result certainty degree and a recognition class corresponding to a detected object from the color image, and
in response to a determination that the RAW image is to be transmitted to an external server, transmit the RAW image to the external server.

2. The image processing device according to claim 1, wherein the processing circuitry is further configured to execute a transmission timing control such that transmission processing of the RAW image to the external server is performed at predetermined time intervals or frame interval units.

3. The image processing device according to claim 1, wherein the processing circuitry is further configured to determine transmission necessity of the RAW image to the external server based on at least any parameter of an imaging parameter of the RAW image or a signal processing parameter that is applied to the RAW image.

4. The image processing device according to claim 3, wherein the imaging parameter and the signal processing parameter include at least any of shutter speed, analog gain, digital gain, a white balance control value, or a high dynamic range control value.

5. The image processing device according to claim 1, wherein the processing circuitry is further configured to determine transmission necessity of the RAW image to the external server based on device information.

6. The image processing device according to claim 5, wherein the device information includes at least any information of information flowing in a bus of image processing circuitry, a number of defective pixels, or abnormality detection information.

7. The image processing device according to claim 1, wherein the processing circuitry is further configured to determine transmission necessity of the RAW image to the external server based on RAW image transmission necessity determination information input from the external server.

8. The image processing device according to claim 7, wherein the RAW image transmission necessity determination information input from the external server is determination information based on an analysis result of the external server with respect to the color image that is transmitted to the external server.

9. The image processing device according to claim 1, wherein the processing circuitry is further configured to determine whether or not at least any parameter of the imaging parameter of the RAW image or the signal processing parameter that is applied to the RAW image is to be transmitted to the external server together with the RAW image.

10. The image processing device according to claim 1, wherein the processing circuitry is further configured to transmit at least any parameter of the imaging parameter of the RAW image or the signal processing parameter that is applied to the RAW image to the external server together with the RAW image.

11. A movable device, comprising:
a camera that is mounted on the movable device; and
processing circuitry configured to
   execute signal processing on a RAW image which is an output of the camera, and generate a color image,
   execute analysis processing of the color image,
   determine whether or not the RAW image is to be transmitted to an external server based on analysis result information, wherein the analysis result information includes a combination of a recognition result certainty degree and a recognition class corresponding to a detected object from the color image, and
   in response to a determination that the RAW image is to be transmitted to an external server, transmit the RAW image to the external server.

12. The movable device according to claim 11,
wherein the processing circuitry is further configured to execute transmission timing control processing such that transmission processing of the RAW image to the external server is performed at predetermined time intervals or frame interval units.

13. The movable device according to claim 11,
wherein the processing circuitry is further configured to determine transmission necessity of the RAW image to the external server based on at least any information of
at least any parameter of an imaging parameter of the RAW image or a signal processing parameter that is applied to the RAW image,
analysis result information,
device information of the image processing device, or
RAW image transmission necessity determination information input from the external server.

14. An image processing system, comprising:
a server; and
processing circuitry configured to
   execute signal processing on a RAW image which is an output of a camera, and generate a color image,
   execute analysis processing of the color image,
   determine whether or not the RAW image is to be transmitted to the server based on analysis result information, wherein the analysis result information includes a combination of a recognition result certainty degree and a recognition class corresponding to a detected object from the color image, and
   in response to a determination that the RAW image is to be transmitted to the server, transmit the RAW image to the server, and
wherein the server receives the RAW image transmitted by the processing circuitry and executes analysis processing of the RAW image.

15. An image processing method executed in an image processing device, the image processing method comprising:
   executing signal processing on a RAW image which is an output of a camera, and generating a color image;
   executing analysis processing of the color image;
   determining whether or not the RAW image is to be transmitted to an external server based on analysis result information, wherein the analysis result information includes a combination of a recognition result certainty degree and a recognition class corresponding to a detected object from the color image; and
   in response to a determination that the RAW image is to be transmitted to an external server, transmitting the RAW image to the external server.

16. A non-transitory computer-readable storage medium storing computer-readable instructions thereon which, when execute by a computer, cause the computer to perform a method, the method comprising:
   executing signal processing on a RAW image which is an output of a camera, and generating a color image;
   executing analysis processing of the color image;
   determining whether or not the RAW image is to be transmitted to an external server based on analysis result information, wherein the analysis result information includes a combination of a recognition result certainty degree and a recognition class corresponding to a detected object from the color image; and
   in response to a determination that the RAW image is to be transmitted to an external server, transmitting the RAW image to the external server.

* * * * *